US011958720B2

(12) United States Patent
Asamura et al.

(10) Patent No.: US 11,958,720 B2
(45) Date of Patent: Apr. 16, 2024

(54) VIBRATION SUPPRESSION DEVICE FOR ROPE-LIKE BODY OF ELEVATOR

(71) Applicant: Mitsubishi Electric Corporation, Tokyo (JP)

(72) Inventors: Tomohiro Asamura, Tokyo (JP); Eiichi Saito, Tokyo (JP); Seiji Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 3 days.

(21) Appl. No.: 17/772,528

(22) PCT Filed: Nov. 6, 2019

(86) PCT No.: PCT/JP2019/043481

§ 371 (c)(1),
(2) Date: Apr. 28, 2022

(87) PCT Pub. No.: WO2021/090401

PCT Pub. Date: May 14, 2021

(65) Prior Publication Data

US 2022/0371858 A1 Nov. 24, 2022

(51) Int. Cl.
*B66B 11/08* (2006.01)
*B66B 7/10* (2006.01)

(52) U.S. Cl.
CPC ................ *B66B 11/08* (2013.01); *B66B 7/10* (2013.01)

(58) Field of Classification Search
CPC .................................. B66B 7/10; B66B 11/08
See application file for complete search history.

(56) References Cited

U.S. PATENT DOCUMENTS

2021/0094793 A1 4/2021 Saito et al.
2021/0094799 A1 4/2021 Saito et al.
(Continued)

FOREIGN PATENT DOCUMENTS

JP 2-117583 A 5/1990
JP 3-26682 A 2/1991
(Continued)

OTHER PUBLICATIONS

Machine Translation of JP 2007-309411.*
(Continued)

*Primary Examiner* — Diem M Tran
(74) *Attorney, Agent, or Firm* — XSENSUS LLP

(57) ABSTRACT

There is provided a vibration suppression device for a rope-like body of an elevator that can inhibit displacement of the rope-like body from becoming unstable due to amplification of the displacement and can make a movable range of the rope-like body wider. A vibration suppression device (20) includes a movable unit and a stopper. The movable unit can move in a direction in which a distance from an equilibrium position (19) of the rope-like body changes. The stopper restricts movement of the movable unit to a position closer than a first distance (d1) from the equilibrium position (19). The movable unit includes a displacement amplifier and a restriction member. The displacement amplifier is arranged to be directed to a first position (P1) of the rope-like body. The displacement amplifier amplifies displacement of the rope-like body. The restriction member inhibits the rope-like body from approaching the displacement amplifier.

8 Claims, 13 Drawing Sheets

(56) References Cited

U.S. PATENT DOCUMENTS

| | | | |
|---|---|---|---|
| 2021/0130127 | A1 | 5/2021 | Saito et al. |
| 2021/0231190 | A1 | 7/2021 | Saito et al. |

FOREIGN PATENT DOCUMENTS

| | | | | | |
|---|---|---|---|---|---|
| JP | 10-30210 | A | | 2/1998 | |
| JP | 2007-309411 | A | | 11/2007 | |
| WO | WO-2019220670 | A1 | * | 11/2019 | ............. B66B 5/022 |
| WO | WO-2019220671 | A1 | * | 11/2019 | ............... B66B 1/28 |

OTHER PUBLICATIONS

International Search Report dated Feb. 4, 2020, received for PCT Application PCT/JP2019/043481, Filed on Nov. 6, 2019, 5 pages including English Translation.

Office Action issued Jan. 8, 2024 in Chinese Patent Application No. 201980101813.0, 14 pages.

* cited by examiner

VIBRATION SUPPRESSION DEVICE FOR ROPE-LIKE BODY OF ELEVATOR

CROSS-REFERENCE TO RELATED APPLICATION

The present application is based on PCT filing PCT/JP2019/043481, filed Nov. 6, 2019, the entire contents of which is incorporated herein by reference.

FIELD

The present invention relates to a vibration suppression device for a rope-like body of an elevator.

BACKGROUND

PTL 1 discloses an example of a vibration suppression device. The vibration suppression device is provided close to an end portion of a main rope above a car. The vibration suppression device exerts a negative restoring force on the main rope of an elevator and thereby amplifies displacement of the main rope. The vibration suppression device inhibits vibration of the main rope by a friction resistance accompanying vibration.

CITATION LIST

Patent Literature

[PTL 1] JP H3-26682 A

SUMMARY

Technical Problem

However, the vibration suppression device of PTL 1 produces a nonlinear negative restoring force by an instability mechanism in which an inverted lever and a spring are combined together. When the negative restoring force produced by the vibration suppression device becomes larger than a positive restoring force of a main rope, displacement of the main rope becomes unstable. That is, in order not to make displacement of the main rope unstable, a movable range of the main rope becomes narrow.

The present invention has been made to solve such problems. An object of the present invention is to provide a vibration suppression device for a rope-like body of an elevator such as a main rope. The vibration suppression device can inhibit displacement of the rope-like body from becoming unstable due to amplification of the displacement and can make a movable range of the rope-like body wider.

Solution to Problem

A vibration suppression device according to the present invention for a rope-like body of an elevator, the vibration suppression device includes: a first unit which is capable of movement in a direction in which a distance from an equilibrium position of vibration of a rope-like body of an elevator changes; and a first stopper which restricts movement of the first unit to a position closer than a first distance from the equilibrium position, wherein the first unit includes: a first displacement amplifier which is arranged to be directed to a first position in a longitudinal direction of the rope-like body and amplifies displacement of vibration of the rope-like body by an attractive force which becomes stronger as the rope-like body approaches closer, and a first restriction member which inhibits the rope-like body from approaching the first displacement amplifier closer than a distance which is in advance set.

Advantageous Effects of Invention

A vibration suppression device according to the present invention can inhibit displacement from becoming unstable due to amplification of displacement of a rope-like body of an elevator and can make a movable range of the rope-like body wider.

DESCRIPTION OF EMBODIMENTS

Hereinafter, embodiments for carrying out the present invention will be described with reference to the accompanying drawings. In each figure, the same reference signs are assigned to the same or corresponding parts, and redundant description is appropriately simplified or omitted.

Embodiment 1

Figure 1:
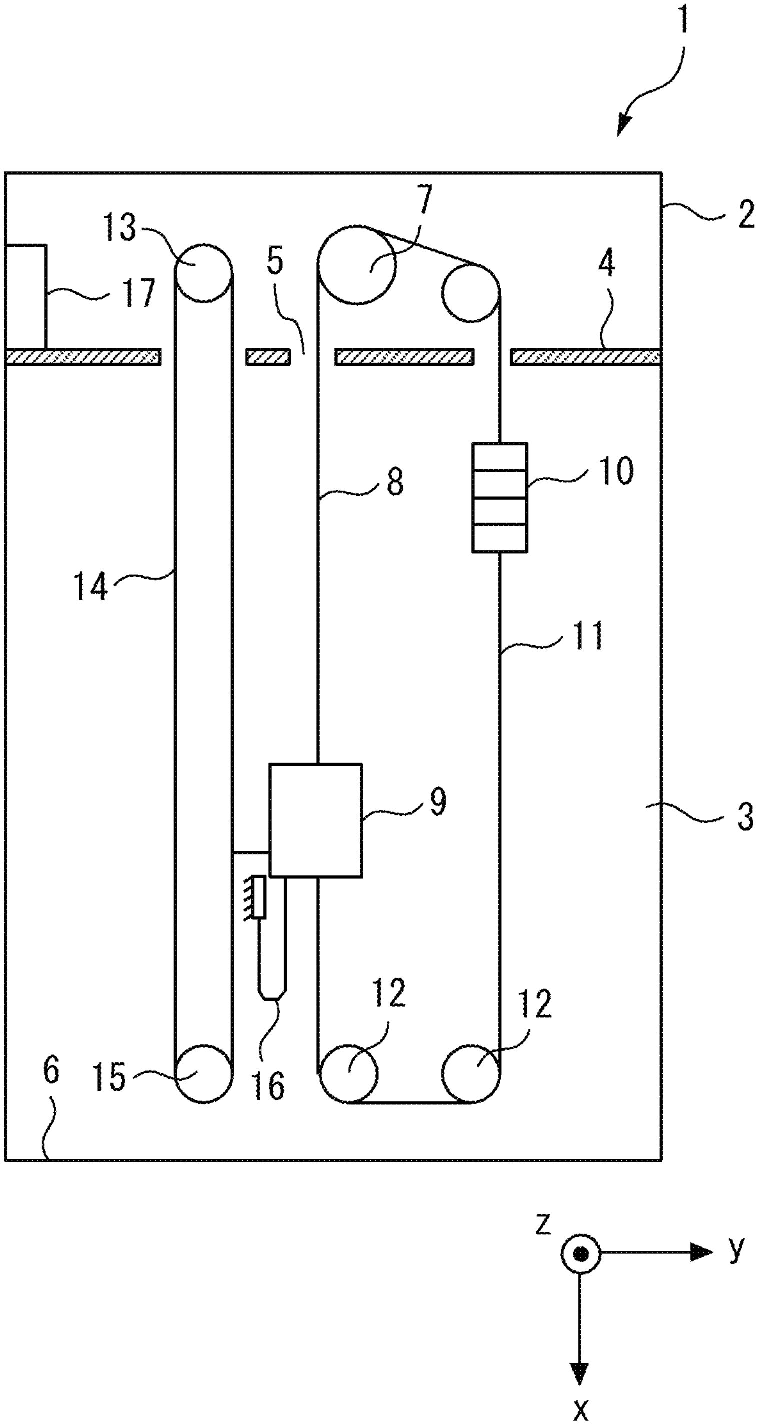
FIG. 1 A configuration diagram of an elevator according to Embodiment 1.
Figure 2:
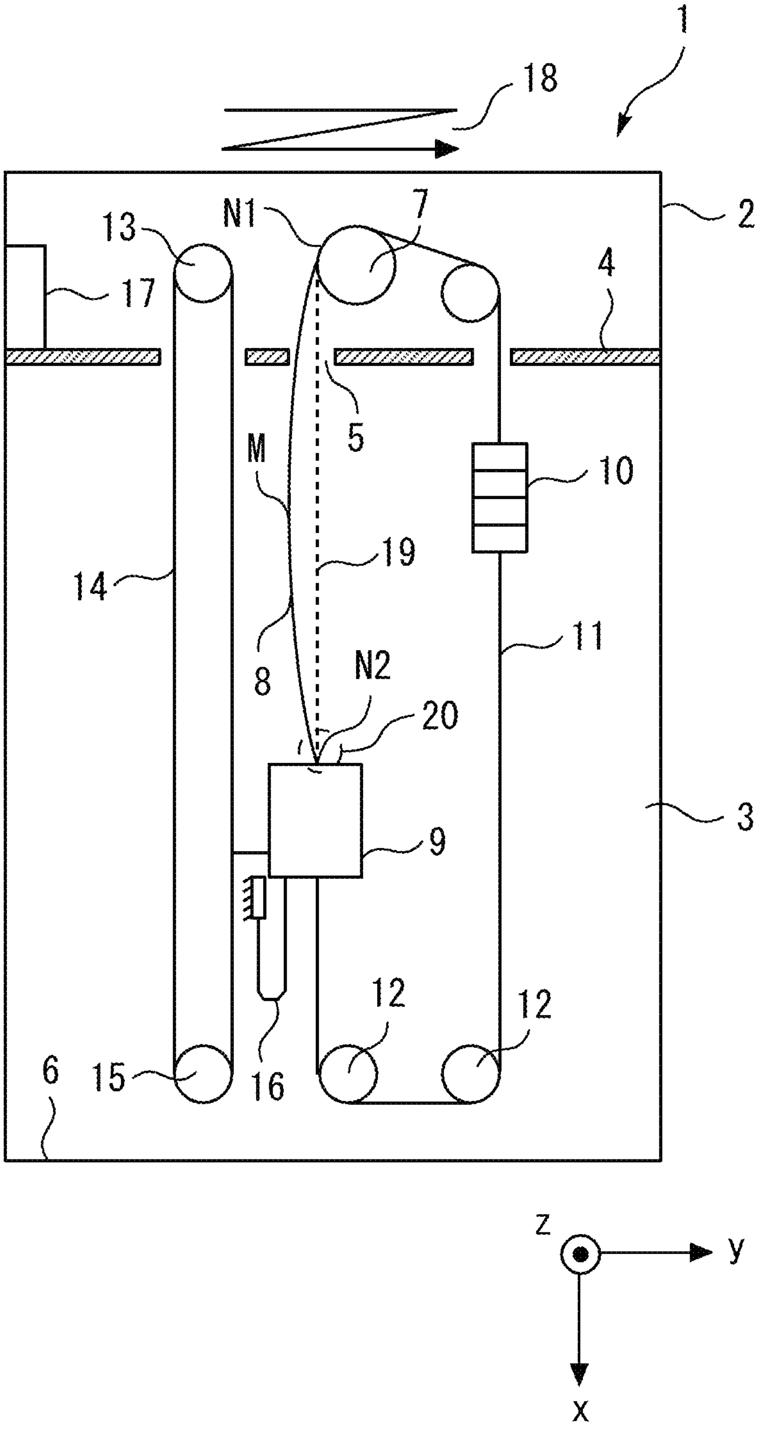
FIG. 2 A configuration diagram of an elevator according to Embodiment 1.

FIG. 1 and FIG. 2 are configuration diagrams of an elevator according to Embodiment 1.

In an example illustrated in FIG. 1, the elevator 1 is applied to a building 2 having a plurality of floors. In the elevator 1, a hoistway 3 is formed throughout the plurality of floors of the building 2. In the elevator 1, a machine room 4 is provided above the hoistway 3. In the machine room 4, a rope duct 5 is formed in a floor surface. The rope duct 5 is an opening leading to the hoistway 3 from the machine room 4. In the elevator 1, a pit 6 is provided in a lower end of the hoistway 3, for example.

The elevator 1 includes a traction machine 7, a main rope 8, a car 9, a counterweight 10, a compensation rope 11, and tension sheaves 12. The traction machine 7 is provided in the machine room 4, for example. The traction machine 7 has a sheave and a motor. The sheave of the traction machine 7 is connected to a rotation shaft of the motor of the traction machine 7. The motor of the traction machine 7 is a device configured to generate a driving force for rotating the sheave of the traction machine 7. The main rope 8 is wrapped around the sheave of the traction machine 7. The main rope 8 extends from the machine room 4 to the hoistway 3 through the rope duct 5. The car 9 and the counterweight 10 are suspended by the main rope 8 in the hoistway 3. The car 9 is a device configured to transport passengers or the like among the plurality of floors by running vertically in the hoistway 3. The counterweight 10 is a device configured to balance a load applied to the sheave of the traction machine 7 with the car 9 through the main rope 8. The car 9 and the counterweight 10 run in the opposite direction to each other in the hoistway 3 when the main rope 8 moves by rotation of the sheave of the traction machine 7. The compensation rope 11 is a device configured to compensate for unbalance between a dead load on the car 9 side of the main rope 8 and a dead load on the counterweight 10 side of the main rope 8, the unbalance being caused by movement of the main rope 8. One end of the compensation rope 11 is attached to the car 9. The other end of the compensation rope 11 is attached to the counterweight 10. The compensation rope 11 is wrapped around the tension sheaves 12. The tension sheaves 12 are sheaves for applying tension to the compensation rope 11. The tension sheaves 12 are provided in the pit 6, for example. The main rope 8 is an example of the rope-like body of the elevator 1. The compensation rope 11 is an example of the rope-like body of the elevator 1. Examples of the rope-like body of the elevator 1 may include a steel wire rope, a belt rope, and a chain.

The elevator 1 includes a governor 13, a governor rope 14, and a governor rope tension sheave 15. The governor 13 is provided in the machine room 4, for example. The governor 13 is a device configure to reduce an excessive running velocity of the car 9. The governor 13 has a sheave. The governor rope 14 is wrapped around the sheave of the governor 13. Both ends of the governor rope 14 are attached to the car 9. The governor rope 14 is wrapped around the governor rope tension sheave 15. The governor rope tension sheave 15 is a sheave for applying tension to the governor rope 14. The governor rope tension sheave 15 is provided in the pit 6, for example. The governor rope 14 is an example of the rope-like body of the elevator 1.

The elevator 1 includes a traveling cable 16 and a control panel 17. The traveling cable 16 is a cable for communicating a control signal or the like. One end of the traveling cable 16 is connected to the car 9. The other end of the traveling cable 16 is attached to a wall surface of the hoistway 3, for example. The control panel 17 is a device configured to control the operation of the elevator 1. The control panel 17 is provided in the machine room 4, for example. The control panel 17 communicates a control signal to the car 9 through the traveling cable 16, for example. The traveling cable 16 is an example of the rope-like body of the elevator 1.

The following description will be made using an xyz orthogonal coordinate system set as follows. A positive direction of the x-axis corresponds to a vertical downward direction. The yz plane is a horizontal plane. A direction of the z-axis corresponds to a direction of a rotation shaft of the sheave of the traction machine 7, for example.

FIG. 2 is a diagram illustrating a state where building sway 18 is occurring in the elevator 1. The building sway 18 is a swaying motion of the building 2 which occurs due to turbulence such as an earthquake or a wind, for example. When the building sway 18 occurs, the traction machine 7 and the governor 13 which are fixed to the building 2 sway together with the building 2. Thus, the vibration is applied to the main rope 8, the compensation rope 11, the governor rope 14, and the traveling cable 16 which are examples of the rope-like body of the elevator 1. Here, when the frequency of the building sway 18 coincides with the natural frequency of any of the rope-like bodies, the sway of the rope-like body increases due to the resonance phenomenon. When the resonance phenomenon occurs in the elevator 1, the rope-like body often resonates with the fundamental vibration. The fundamental vibration is vibration corresponding to the lowest natural frequency. In an example illustrated in FIG. 2, the resonance phenomenon is occurring with the fundamental vibration of a portion on the car 9 side of the main rope 8.

In this example, the portion on the car 9 side of the main rope 8 is drawn from the sheave of the traction machine 7 toward the hoistway 3 and is attached to the car 9. Therefore, nodes of the fundamental vibration of the portion on the car 9 side of the main rope 8 are a point N1 drawn from the sheave of the traction machine 7 and a point N2 attached to the car 9. An antinode of the fundamental vibration of the portion on the car 9 side of the main rope 8 is a midpoint M between the two nodes. The portion on the car 9 side of the main rope 8 vibrates in a lateral direction about an equilibrium position 19 due to a positive restoring force. The equilibrium position 19 is a position of the rope-like body in a state where it is not vibrating. The positive restoring force is a force acting on the rope-like body that is displaced from the equilibrium position 19 in a direction of returning the rope-like body to the equilibrium position 19. The positive restoring force is a force of the tension of the rope-like body, for example. The lateral direction is a direction perpendicular to the longitudinal direction of the rope-like body, for example. In the following, the portion on the car 9 side of the main rope 8 will be described as an example of a vibrating portion of the rope-like body. Here, the rope-like body such as the main rope 8 has ferromagnetism by containing a ferromagnetic body or the like, for example.

When the rope-like body such as the main rope 8 greatly vibrates, it may cause a trouble in operation of the elevator 1. Therefore, a vibration suppression device is provided in the elevator 1. The vibration suppression device is a device for suppressing the vibration of the vibrating portion of the rope-like body. The vibration suppression device is provided in a portion closer to the node than to the antinode of the vibrating portion of the rope-like body, for example. In this example, the vibration suppression device is provided in a portion above the car 9.

Subsequently, a configuration of a vibration suppression device 20 will be described with reference to FIG. 3 and FIG. 4.

Figure 3:
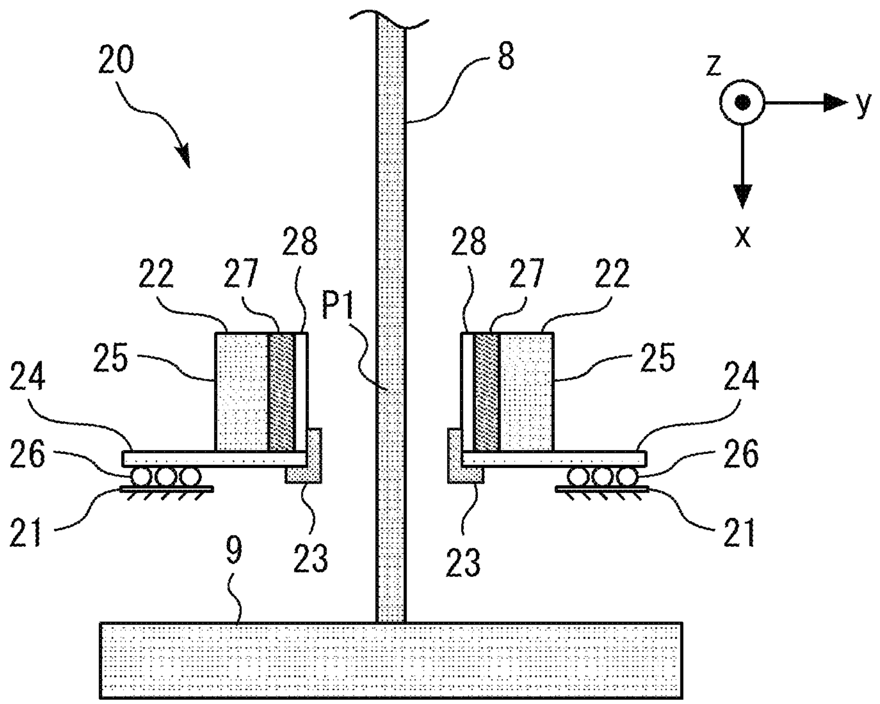
FIG. 3 A configuration diagram of the vibration suppression device according to Embodiment 1.
Figure 4:
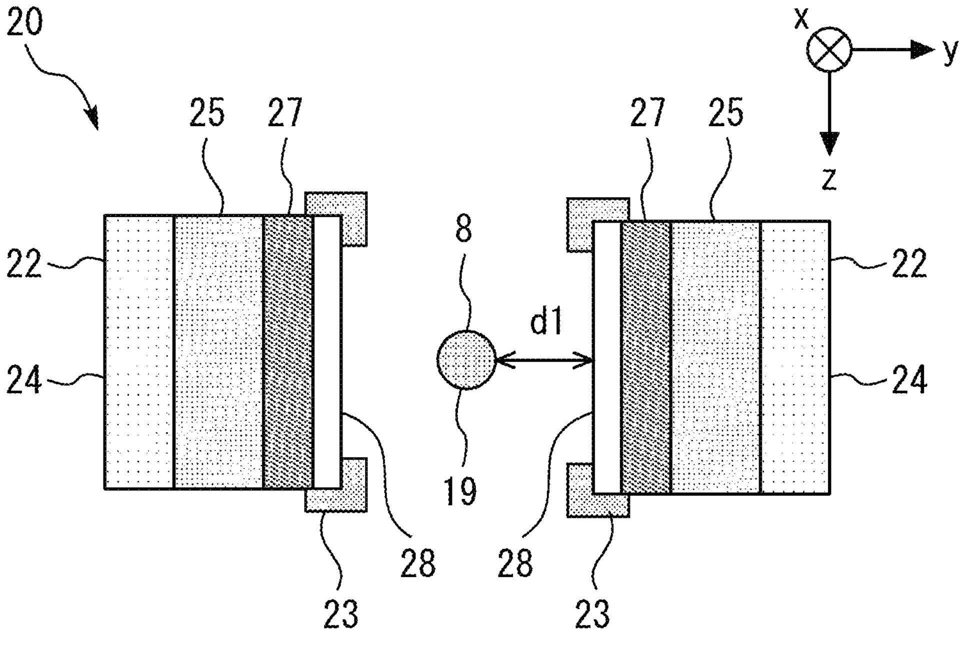
FIG. 4 A configuration diagram of the vibration suppression device according to Embodiment 1.

FIG. 3 and FIG. 4 are configuration diagrams of the vibration suppression device according to Embodiment 1.

FIG. 3 illustrates the vibration suppression device 20 as seen from a direction parallel with the z axis. In this example, the vibration suppression device 20 inhibits vibration of the main rope 8 in a y-axis direction. Note that the vibration suppression device 20 may be arranged to inhibit vibration of the rope-like body such as the main rope 8 in other directions in a yz plane, which include a z-axis direction. The vibration suppression device 20 is provided to a car frame in a portion above the car 9, for example. Support bases 21 are provided in portions above the car 9. The support bases 21 are provided to be fixed to the car 9. In this example, an upper surface of the support base 21 is a flat surface. The vibration suppression device 20 includes one pair of movable units 22 and one pair of stoppers 23.

The pair of movable units 22 are arranged to be symmetric with respect to the main rope 8. One of the movable units 22 is arranged on a positive side of the main rope 8 in the y-axis direction. The other movable unit 22 is arranged on a negative side of the main rope 8 in the y-axis direction. Each of the pair of movable units 22 is arranged to be directed to a first position P1 in the longitudinal direction of the rope-like body. The first position P1 is a position closer to the node than the antinode of the fundamental vibration of the rope-like body such as the main rope 8, for example. Each of the pair of movable units 22 is an example of a first unit. Each of the pair of movable units 22 includes a movable dolly 24 and a magnet unit 25.

The movable dolly 24 is a dolly which is capable of movement in a direction in which the distance from the equilibrium position 19 of the main rope 8 changes. In this example, the movable dolly 24 is capable of moving in the y-axis direction. Further, the movable dolly 24 moves in a vibration plane of the main rope 8. The movable dolly 24 includes wheels 26. The wheel 26 rolls on the upper surface of the support base 21 in the y-axis direction. The wheels 26 support the weight of the movable unit 22. The movable unit 22 moves, by the movable dolly 24, in a direction in which the distance from the equilibrium position 19 of the main rope 8 changes.

The magnet unit 25 moves together with the movable dolly 24. The magnet unit 25 includes a displacement amplification magnet 27 and a restriction member 28.

The displacement amplification magnet 27 is a permanent magnet, for example. A magnetic pole of an end portion of the displacement amplification magnet 27 is directed to the first position P1 of the main rope 8. The displacement amplification magnet 27 causes a magnetic force to act, as an attractive force, on the rope-like body by a magnetic field. The attractive force by the magnetic force becomes stronger as the main rope 8 approaches the displacement amplification magnet 27 closer. When the main rope 8 is displaced by vibration, the displacement amplification magnet 27 causes the attractive force to act on the main rope 8 in the same direction as the displacement of the main rope 8. This attractive force serves as a negative restoring force which amplifies the displacement of vibration of the main rope 8. The negative restoring force is a negative rigidity force, for example. The displacement amplification magnet 27 is an example of a first displacement amplifier which amplifies displacement of vibration of the main rope 8.

The restriction member 28 is provided to the magnetic pole of the displacement amplification magnet 27 which is directed to the first position P1 of the main rope 8. The restriction member 28 is arranged between the magnetic pole of the end portion of the displacement amplification magnet 27 and the main rope 8. The restriction member 28 inhibits the main rope 8 from approaching the displacement amplification magnet 27 closer than the thickness of the restriction member 28. The restriction member 28 is an example of a first restriction member. The restriction member 28 is a non-magnetic body.

Each of the pair of stoppers 23 is fixed to the support base 21, for example. The pair of stoppers 23 are arranged to be symmetric with respect to the main rope 8. One of the stoppers 23 is arranged on a positive side of the main rope 8 in the y-axis direction. The other stopper 23 is arranged on a negative side of the main rope 8 in the y-axis direction. The stopper 23 on the positive side in the y-axis direction corresponds to the movable unit 22 on the positive side in the y-axis direction. The stopper 23 on the negative side in the y-axis direction corresponds to the movable unit 22 on the negative side in the y-axis direction. The stopper 23 is a member which restricts movement of the corresponding movable unit 22. Each of the pair of stoppers 23 is an example of a first stopper.

FIG. 4 illustrates the vibration suppression device 20 as seen from above. The stopper 23 restricts movement of the corresponding movable unit 22 to a position closer than a first distance d1 from the equilibrium position 19 of the main rope 8. The first distance d1 is a distance which is in advance set based on vibration suppression performance necessary for the vibration suppression device 20. The vibration suppression performance of the vibration suppression device 20 is defined by the magnetic force which is caused to act by the displacement amplification magnet 27, for example. The stopper 23 supports the restriction member 28 from a side of the main rope 8 and thereby restricts movement of the movable unit 22. The stopper 23 is arranged on the outside of the vibration plane of the main rope 8. In this example, the stopper 23 is divided into two portions which form symmetry with respect to the vibration plane.

The thickness of the restriction member 28 is set based on the positive restoring force of the main rope 8 and on the magnetic force which is caused to act by the displacement amplification magnet 27. The thickness of the restriction member 28 is set to such a thickness that the magnetic force at a time when the main rope 8 contacts with the restriction member 28 of the movable unit 22, the restriction member 28 being in a position at the first distance d1 from the equilibrium position 19, does not exceed the positive restoring force of the main rope 8. That is, the thickness of the restriction member 28 is set to such a thickness that a negative restoring force by a displacement amplifier does not exceed a positive restoring force of the rope-like body such as the main rope 8.

Subsequently, an example of action of the vibration suppression device 20 will be described with reference to FIG. 5 to FIG. 7.

Figure 5:
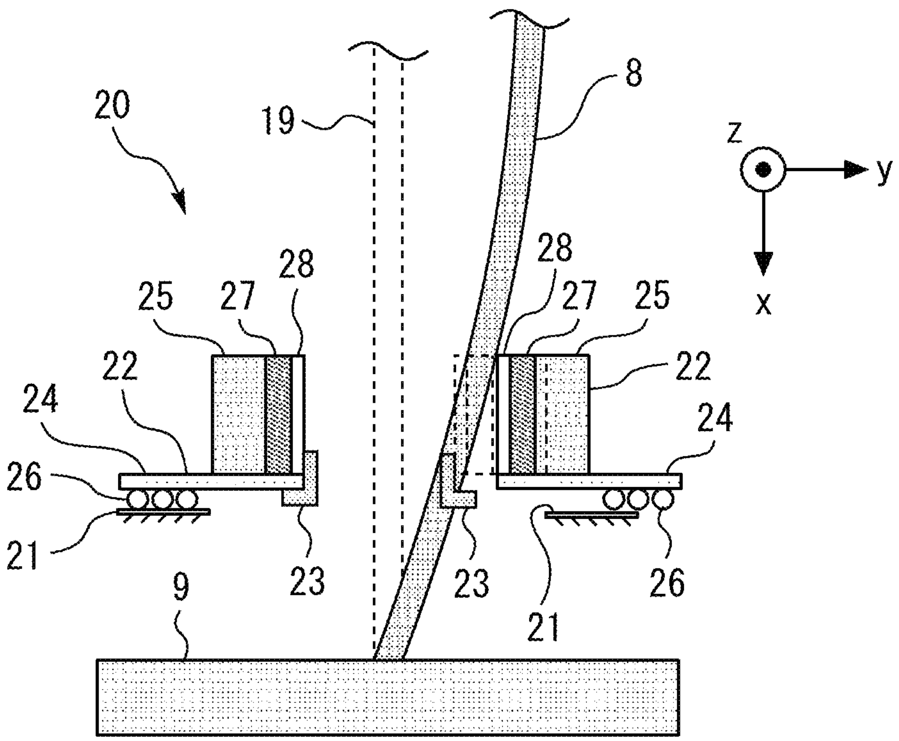
FIG. 5 A configuration diagram of the vibration suppression device according to Embodiment 1.
Figure 6:
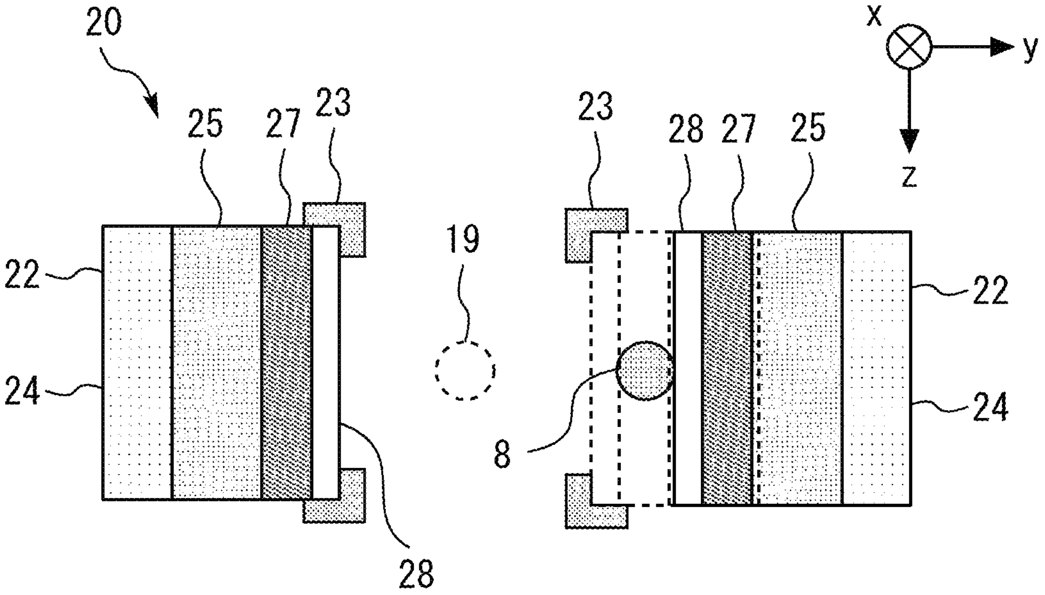
FIG. 6 A configuration diagram of the vibration suppression device according to Embodiment 1.

FIG. 5 and FIG. 6 are configuration diagrams of the vibration suppression device according to Embodiment 1.

Figure 7:
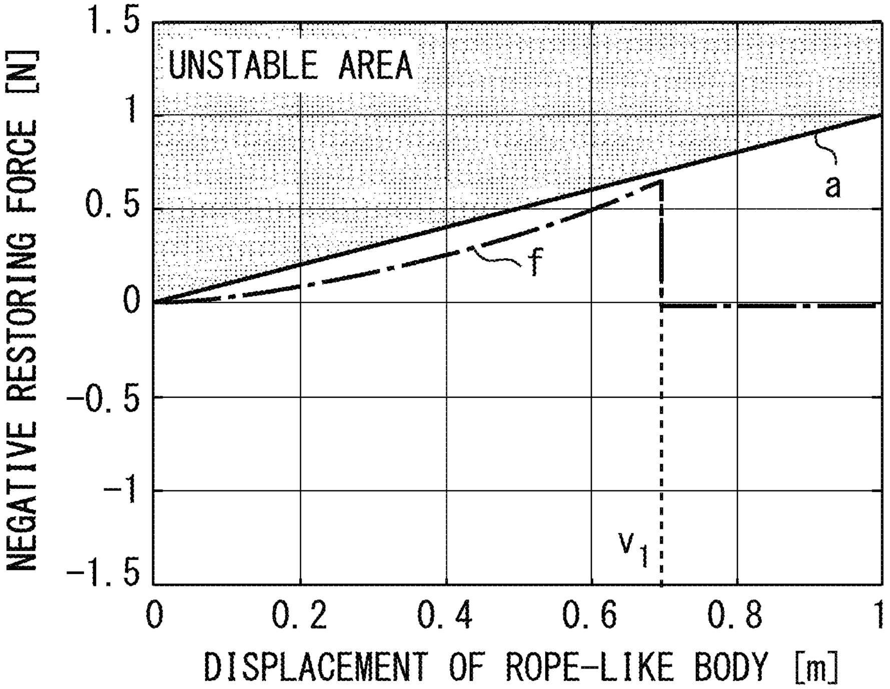
FIG. 7 A diagram illustrating an example of a negative restoring force by the vibration suppression device according to Embodiment 1.

FIG. 7 is a diagram illustrating an example of a negative restoring force by the vibration suppression device according to Embodiment 1.

FIG. 5 illustrates the vibration suppression device 20 as seen from a direction parallel with the z axis. The main rope 8 is displaced in the lateral direction by vibration. The main rope 8 vibrates around the equilibrium position 19 as a center by the positive restoring force such as a tension. When the main rope 8 is present in the vicinity of the equilibrium position 19, the main rope 8 does not contact with the restriction member 28. In this case, the movable unit 22 is in the position at the first distance d1 from the equilibrium position 19. The movable unit 22 in this position causes an attractive force in the same direction as displacement of the main rope 8 to act on the main rope 8 by the magnetic force of the displacement amplification magnet 27. Here, the movable unit 22 receives a force, as a reaction, in a direction to approach the equilibrium position 19. In this case, because the stopper 23 restricts movement of the corresponding movable unit 22, the movable unit 22 does not move. Accordingly, displacement of the first position P1 of the main rope 8 is amplified. The displacement of the first position P1 is amplified, and dissipation of energy by a friction resistance or the like in a connection portion between the main rope 8 and the car 9 is thereby amplified, for example. Further, in order to further enhance dissipation of energy, a separate damper may be mounted between the support base 21 and the movable unit 22. That is, the energy of vibration of the main rope 8 is consumed, and vibration of the main rope 8 is thereby suppressed.

Meanwhile, in a case where the building sway 18 is large, for example, the magnitude of displacement of the first position P1 by vibration of the main rope 8 may exceed the first distance d1.

FIG. 6 illustrates the vibration suppression device 20 as seen from above. Because the stopper 23 is arranged on the outside of the vibration plane of the main rope 8, the main rope 8 contacts with the restriction member 28. The main rope 8 continues motion in a direction separating from the equilibrium position 19 by inertia. The main rope 8 pushes the movable unit 22 in a direction separating from the equilibrium position 19 via the restriction member 28. The movable unit 22 moves, on the upper surface of the support base 21, in the direction separating from the equilibrium position 19. In this case, the movable unit 22 performs motion together with the main rope 8. The magnetic force of the displacement amplification magnet 27 serves as an internal force of a system including the movable unit 22 and the main rope 8. Thus, the magnetic force of the displacement amplification magnet 27 does not cause a negative restoring force to act on the main rope 8 when the movable unit 22 performs motion together with the main rope 8. In this period, the restriction member 28 inhibits the distance between the main rope 8 and the displacement amplification magnet 27 from becoming closer than the thickness of the restriction member 28.

In a process where the main rope 8 returns to the equilibrium position 19 by the positive restoring force, the movable unit 22 which performs motion together with the main rope 8 contacts with the stopper 23. The restriction member 28 causes the main rope 8 not to approach the displacement amplification magnet 27 closer than the thickness of the restriction member 28. Thus, the magnitude of the positive restoring force of the main rope 8 at a time when the movable unit 22 contacts with the stopper 23 is larger than the magnitude of the negative restoring force by the displacement amplification magnet 27. Accordingly, the main rope 8 returns to the equilibrium position 19 by the positive restoring force.

FIG. 7 illustrates the relationship between the displacement of the first position P1 of the main rope 8 and the magnitude of the negative restoring force. The horizontal axis of the graph in FIG. 7 represents the magnitude of displacement of the first position P1 of the main rope 8 in the lateral direction. The vertical axis of the graph in FIG. 7 represents the magnitude of the negative restoring force applied to the main rope 8 by the displacement amplification magnet 27. In the graph in FIG. 7, displacement $v_1$ represents displacement at a time when the main rope 8 contacts with the restriction member 28.

The vibration suppression device 20 amplifies the displacement of the first position P1 and thereby suppresses vibration of the main rope 8. Thus, when the magnitude of the negative restoring force is close to the magnitude of the positive restoring force, the vibration suppression performance of the vibration suppression device 20 is enhanced. On the other hand, when the magnitude of the negative restoring force exceeds the magnitude of the positive restoring force, the displacement of the main rope 8 becomes unstable. In this case, the main rope 8 does not return to the equilibrium position 19. A straight line a indicates the magnitude of the linear positive restoring force exerted on the main rope 8. In the graph in FIG. 7, an area above the straight line a is an unstable area.

A curve f indicates the negative restoring force by the vibration suppression device 20. In an area where the displacement is smaller than $v_1$, the main rope 8 receives the negative restoring force from the displacement amplification magnet 27. The negative restoring force by instability is a non-linear force with respect to displacement. Thus, in a case where the negative restoring force is caused to continue to act even when displacement becomes large, the magnitude of the negative restoring force may exceed the magnitude of the linear positive restoring force. Meanwhile, in an area where displacement is larger than $v_1$, the movable unit 22 performs motion together with the main rope 8. In this case, the movable unit 22 does not cause the negative restoring force to act on the main rope 8. Further, even in the area where displacement is larger than $v_1$, the positive restoring force acts on the main rope 8. Thus, even when displacement exceeds $v_1$, the displacement of the main rope 8 does not become unstable.

As described above, the vibration suppression device 20 according to Embodiment 1 includes the first unit and the first stopper. The first unit is a portion which is capable of movement in a direction in which the distance from the equilibrium position 19 of vibration of the rope-like body of the elevator 1 changes. The first stopper restricts movement of the first unit to a position closer than the first distance d1 from the equilibrium position 19. The first unit includes the first displacement amplifier and the first restriction member. The first displacement amplifier is arranged to be directed to the first position P1 in the longitudinal direction of the rope-like body. The first displacement amplifier amplifies displacement of vibration of the rope-like body by an attractive force which becomes stronger as the rope-like body approaches closer. The first restriction member inhibits the rope-like body from approaching the first displacement amplifier closer than a distance which is in advance set.

The first restriction member causes the rope-like body not to come close to the first displacement amplifier, to the distance in which displacement of the rope-like body becomes unstable. This inhibits the displacement of the rope-like body from becoming unstable due to amplification of displacement. Further, the first unit is a portion which is capable of movement in a direction separating from the equilibrium position 19. Thus, when the rope-like body contacts with the first restriction member, the first unit can move together with the rope-like body. Accordingly, a movable range of the first position P1 of the rope-like body becomes wider. Consequently, the vibration suppression device 20 can more effectively suppress vibration of the rope-like body.

Further, the first displacement amplifier amplifies displacement of the rope-like body by a magnetic force, the rope-like body having magnetism. The first restriction member is provided to an end portion of the first displacement amplifier on a side directed to the rope-like body. The first restriction member is a non-magnetic body.

Accordingly, the vibration suppression device 20 can be configured as a device which is passive. In particular, in a case where the first displacement amplifier uses a permanent magnet, the vibration suppression device 20 does not need energy supply from the outside.

Note that the movable unit 22 may not have to have the movable dolly 24. The movable unit 22 may be a magnet unit 25 which moves in a horizontal direction by a guide rail or the like provided to the support base 21, for example.

Further, the rope-like body of the elevator 1 may be a long structure which has flexibility and can bear a tension load particularly in the longitudinal direction, for example. The rope-like body may be a bundle of a plurality of a main ropes 8, for example.

Further, the vibration suppression device 20 may be provided to the machine room 4. In a case where the rope-like body is wrapped around the sheave provided to the pit 6, for example, the vibration suppression device 20 may be provided, in the pit 6, in a position closer to the sheave than the antinode. Further, in a case where the elevator 1 does not have the machine room 4, the traction machine 7 is provided to an upper portion or a lower portion of the hoistway 3, for example. In this case, the vibration suppression device 20 may be provided in a position closer to the traction machine 7 than the antinode in the hoistway 3.

Embodiment 2

A particularly detailed description will be made about points in Embodiment 2 which are different from examples disclosed in Embodiment 1. As characteristics which will not be described in Embodiment 2, any characteristics of the examples disclosed in Embodiment 1 may be employed.

Figure 8:
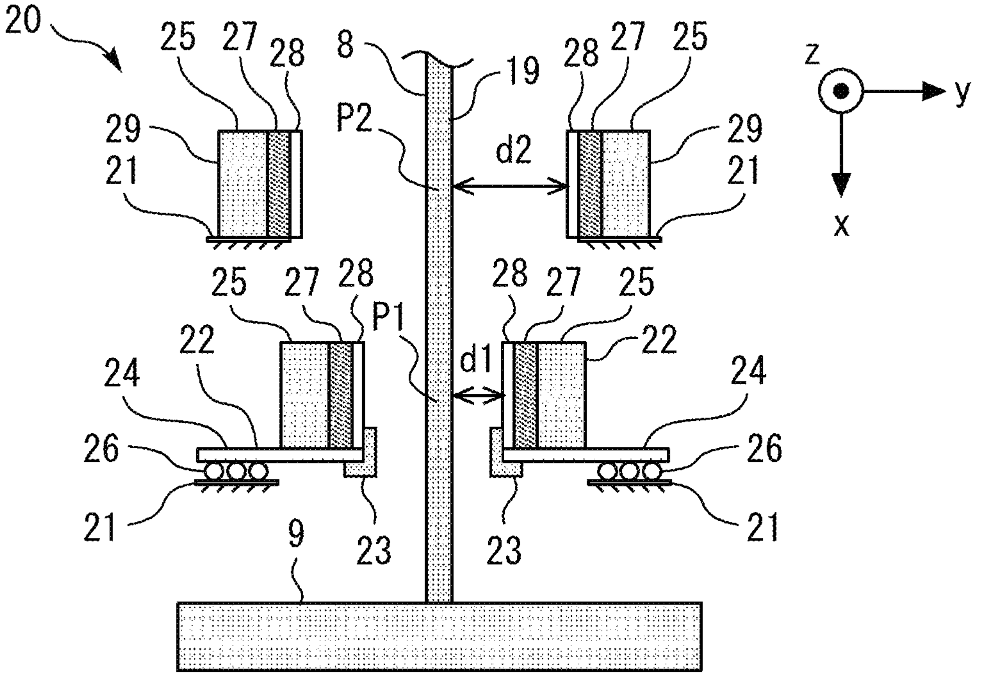
FIG. 8 A configuration diagram of a vibration suppression device according to Embodiment 2.

FIG. 8 is a configuration diagram of a vibration suppression device according to Embodiment 2.

FIG. 8 illustrates a vibration suppression device 20 as seen from a direction parallel with the z axis. The vibration suppression device 20 is provided to a car frame in a portion above the car 9, for example. Support bases 21 are provided in portions above the car 9. The support bases 21 are provided to be fixed to the car 9. In this example, an upper surface of the support base 21 is a flat surface. The vibration suppression device 20 includes one pair of movable units 22, one pair of stoppers 23, and one pair of fixed units 29.

The pair of fixed units 29 are arranged to be symmetric with respect to the main rope 8. One of the fixed units 29 is arranged on a positive side of the main rope 8 in the y-axis direction. The other fixed unit 29 is arranged on a negative side of the main rope 8 in the y-axis direction. The fixed unit 29 on the positive side in the y-axis direction is arranged to be in parallel juxtaposed to the movable unit 22 on the positive side in the y-axis direction in a vertical plane. The fixed unit 29 on the negative side in the y-axis direction is arranged to be in parallel juxtaposed to the movable unit 22 on the negative side in the y-axis direction in a vertical plane. Each of the pair of fixed units 29 is arranged to be directed to a second position P2 in the longitudinal direction of the rope-like body. The second position P2 is a position closer to a node than an antinode of the fundamental vibration of the rope-like body such as the main rope 8, for example. The second position P2 is a different position from the first position P1 in the longitudinal direction of the main rope 8. In this example, the second position P2 is a position closer to the antinode of the fundamental vibration than the first position P1. Each of the pair of the fixed units 29 is arranged in a position at a second distance d2 from the equilibrium position 19 of the main rope 8. The second distance d2 is a distance which is in advance set based on vibration suppression performance necessary for the vibration suppression device 20. In this example, the second distance d2 is a longer distance than the first distance d1. Each of the pair of fixed units 29 is an example of a second unit. Each of the pair of fixed units 29 includes the magnet unit 25.

The magnet unit 25 of the fixed unit 29 includes the displacement amplification magnet 27 and the restriction member 28.

The displacement amplification magnet 27 of the fixed unit 29 is configured similarly to the displacement amplification magnet 27 of the movable unit 22, for example. A magnetic pole of an end portion of the displacement amplification magnet 27 of the fixed unit 29 is directed to the second position P2 of the main rope 8. The displacement amplification magnet 27 of the fixed unit 29 is an example of a second displacement amplifier.

The restriction member 28 of the fixed unit 29 is configured similarly to the restriction member 28 of the movable unit 22, for example. The restriction member 28 of the fixed unit 29 is provided to the magnetic pole of the displacement amplification magnet 27 which is directed to the second position P2 of the main rope 8. The restriction member 28 of the fixed unit 29 is an example of a second restriction member.

The thickness of the restriction member 28 of the fixed unit 29 is set based on a positive restoring force of the main rope 8 and on a magnetic force which is caused to act by the displacement amplification magnet 27. The thickness of the restriction member 28 of the fixed unit 29 is set to such a thickness that the magnetic force at a time when the main rope 8 contacts with the restriction member 28 of the fixed unit 29, the restriction member 28 being in a position at the second distance d2 from the equilibrium position 19, does not exceed the positive restoring force of the main rope 8. That is, the thickness of the restriction member 28 of the fixed unit 29 is set to such a thickness that a negative restoring force by a displacement amplifier does not exceed a positive restoring force of the rope-like body such as the main rope 8. The thickness of the restriction member 28 of the fixed unit 29 may be different from the thickness of the restriction member 28 of the movable unit 22.

Subsequently, an example of action of the vibration suppression device 20 will be described with reference to FIG. 9 and FIG. 10.

Figure 9:
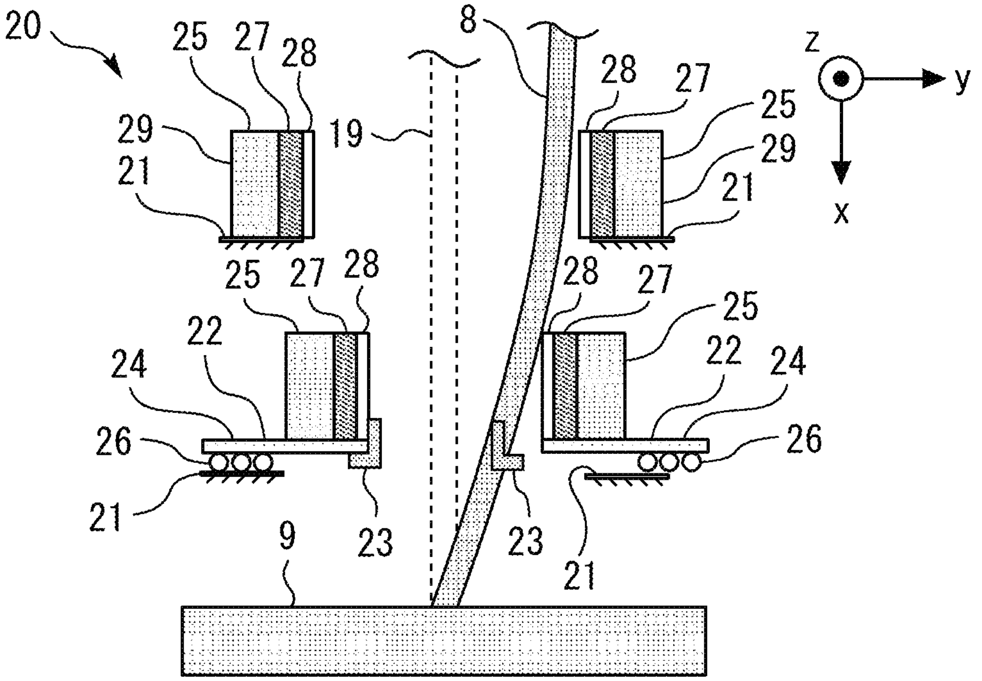
FIG. 9 A configuration diagram of the vibration suppression device according to Embodiment 2.

FIG. 9 is a configuration diagram of the vibration suppression device according to Embodiment 2.

Figure 10:
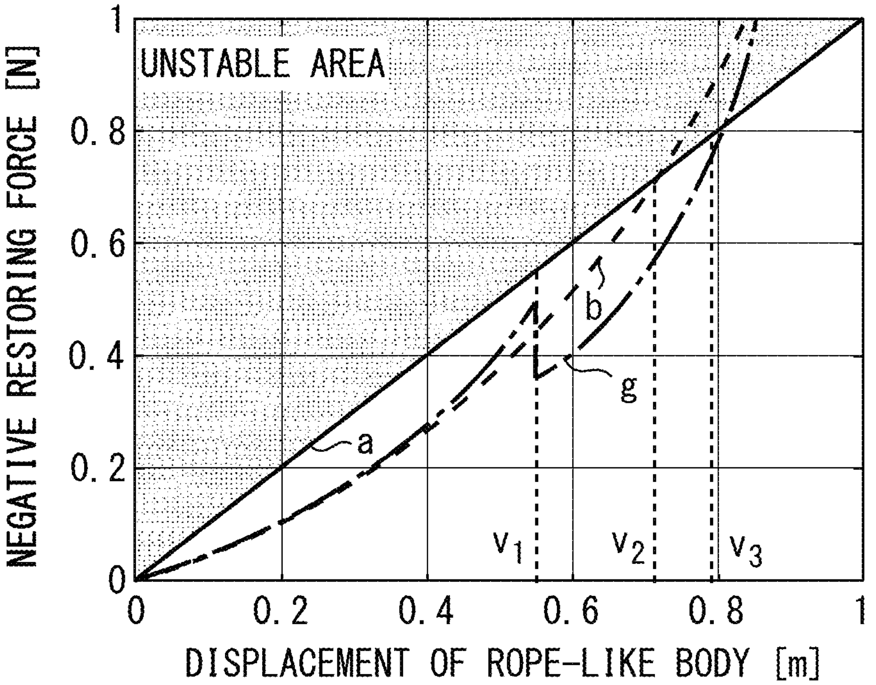
FIG. 10 A diagram illustrating an example of a negative restoring force by the vibration suppression device according to Embodiment 2.

FIG. 10 is a diagram illustrating an example of a negative restoring force by the vibration suppression device according to Embodiment 2.

FIG. 9 illustrates the vibration suppression device 20 as seen from a direction parallel with the z axis. The main rope 8 is displaced in the lateral direction by vibration. The main rope 8 vibrates around the equilibrium position 19 as a center by the positive restoring force such as a tension. When the main rope 8 is present in the vicinity of the equilibrium position 19, the main rope 8 does not contact with the restriction member 28 of the movable unit 22. In this case, the movable unit 22 is in the position at the first distance d1 from the equilibrium position 19. The movable unit 22 in this position causes an attractive force in the same direction as displacement of the main rope 8 to act on the main rope 8 by the magnetic force of the displacement amplification magnet 27. Here, the movable unit 22 receives a force, as a reaction, in a direction to approach the equilibrium position 19. In this case, because the stopper 23 restricts movement of the corresponding movable unit 22, the movable unit 22 does not move. Accordingly, displacement of the first position P1 of the main rope 8 is amplified. Further, the fixed unit 29 causes an attractive force in the same direction as displacement of the main rope 8 to act on the main rope 8 by the magnetic force of the displacement amplification magnet 27. The fixed unit 29 is fixed in a portion above the car 9. Thus, displacement of the second position P2 of the main rope 8 is amplified. The displacement of the first position P1 and the displacement of the second position P2 are amplified, and dissipation of energy by a friction resistance or the like in a connection portion between the main rope 8 and the car 9 is thereby amplified, for example. That is, the energy of vibration of the main rope 8 is consumed, and vibration of the main rope 8 is thereby suppressed.

Meanwhile, in a case where the building sway 18 is large, for example, the magnitude of displacement of the first position P1 by vibration of the main rope 8 may exceed the first distance d1. In this case, the main rope 8 contacts with the restriction member 28 of the movable unit 22. The main rope 8 continues motion in a direction separating from the equilibrium position 19 by inertia. The main rope 8 pushes the movable unit 22 in a direction separating from the equilibrium position 19 via the restriction member 28. The movable unit 22 moves, on the upper surface of the support base 21, in the direction separating from the equilibrium position 19. In this case, the movable unit 22 performs motion together with the main rope 8. The magnetic force of the displacement amplification magnet 27 of the movable unit 22 serves as an internal force of a system including the movable unit 22 and the main rope 8. Thus, the magnetic force of the displacement amplification magnet 27 of the movable unit 22 does not cause a negative restoring force to act on the main rope 8 when the movable unit 22 performs motion together with the main rope 8. In this period, the restriction member 28 of the movable unit 22 inhibits the distance between the main rope 8 and the displacement amplification magnet 27 of the movable unit 22 from becoming closer than the thickness of the restriction member 28.

While the magnitude of displacement of the second position P2 by vibration of the main rope 8 does not exceed the second distance d2, the displacement amplification magnet 27 of the fixed unit 29 continues to amplify the displacement of the second position P2 of the main rope 8.

Here, in a case where the building sway 18 is much larger, for example, the magnitude of displacement of the second position P2 by vibration of the main rope 8 may reach the second distance d2. In this case, the main rope 8 contacts with the restriction member 28 of the fixed unit 29. A portion of the main rope 8 which is closer to the antinode than the second position P2 continues motion by inertia. On the other hand, a portion of the second position P2 of the main rope 8 contacts with the restriction member 28 of the fixed unit 29 and thereby stops. In this period, the restriction member 28 of the fixed unit 29 inhibits the distance between the main rope 8 and the displacement amplification magnet 27 of the fixed unit 29 from becoming closer than the thickness of the restriction member 28.

In a process where the main rope 8 returns to the equilibrium position 19 by the positive restoring force, the main rope 8 is separated from the restriction member 28 of the fixed unit 29. The restriction member 28 of the fixed unit 29 causes the main rope 8 not to approach the displacement amplification magnet 27 of the fixed unit 29 closer than the thickness of the restriction member 28. Thus, the magnitude of the positive restoring force of the main rope 8 at a time when the main rope 8 is separated from the restriction member 28 of the fixed unit 29 is larger than the magnitude of the negative restoring force by the displacement amplification magnet 27. Accordingly, the main rope 8 continues motion to return to the equilibrium position 19 by the positive restoring force.

Subsequently, the movable unit 22 which performs motion together with the main rope 8 contacts with the stopper 23. The restriction member 28 of the movable unit 22 causes the main rope 8 not to approach the displacement amplification magnet 27 of the movable unit 22 closer than the thickness of the restriction member 28. Thus, the magnitude of the positive restoring force of the main rope 8 at a time when the movable unit 22 contacts with the stopper 23 is larger than the magnitude of the negative restoring force by the displacement amplification magnet 27 of the movable unit 22. Accordingly, the main rope 8 returns to the equilibrium position 19 by the positive restoring force.

Similarly to FIG. 7, FIG. 10 illustrates the relationship between the displacement of the main rope 8 and the magnitude of the negative restoring force. In the graph in FIG. 10, displacement $v_1$ represents displacement at a time when a portion of the first position P1 of the main rope 8 contacts with the restriction member 28 of the movable unit 22. In the graph in FIG. 10, displacement $v_3$ represents displacement at a time when a portion of the second position P2 of the main rope 8 contacts with the restriction member 28 of the fixed unit 29.

Here, a curve b indicates a negative restoring force by a vibration suppression device which includes fixed units but includes no movable unit. The negative restoring force by instability is a non-linear force with respect to displacement. Thus, in displacement $v_2$, the magnitude of the negative restoring force exceeds the magnitude of the linear positive restoring force. In such a vibration suppression device, the displacement of the main rope 8 is restricted to a range which does not exceed $v_2$.

On the other hand, a curve g indicates the negative restoring force by the vibration suppression device 20 according to Embodiment 2. In an area where the displacement is smaller than $v_1$, the main rope 8 receives the negative restoring forces from the displacement amplification magnets 27 of both the movable unit 22 and the fixed unit 29. Meanwhile, in an area where displacement is larger than $v_1$, the movable unit 22 performs motion together with the main rope 8. In this case, the movable unit 22 does not cause the negative restoring force to act on the main rope 8. Here, in an area where the displacement is smaller than $v_3$, the main rope 8 receives the negative restoring force from the displacement amplification magnet 27 of the fixed unit 29. Thus, the negative restoring force temporarily lowers when the displacement exceeds $v_1$. In this case, the negative restoring force does not become zero. Because the movable unit 22 does not cause the negative restoring force to act in the area where the displacement is larger than $v_1$, the negative restoring force by the fixed unit 29 does not exceed the magnitude of the positive restoring force until the displacement reaches the displacement $v_3$ which is larger than the displacement $v_2$. That is, a movable range of the displacement of the main rope 8 is expanded to a range which exceeds $v_2$.

As described above, the vibration suppression device 20 according to Embodiment 2 includes the second unit. The second unit is provided in the position at the second distance d2 from the equilibrium position 19. The second unit includes the second displacement amplifier and the second restriction member. The second displacement amplifier is arranged to be directed to the second position P2 in the longitudinal direction of the rope-like body. The second position P2 is a different position from the first position P1 in the longitudinal direction. The second displacement amplifier amplifies displacement of vibration of the rope-like body by an attractive force which becomes stronger as the rope-like body approaches closer. The second restriction member inhibits the rope-like body from approaching the second displacement amplifier closer than a distance which is in advance set.

Accordingly, even after the rope-like body contacts with the first restriction member of the first unit, the vibration suppression device 20 can amplify displacement of the rope-like body by the second unit. Further, a movable range of the displacement of the rope-like body becomes wider than a case where a single fixed unit suppresses vibration.

Note that the second position P2 may be a position farther from the antinode of the fundamental vibration of the main rope 8 than the first position P1. In this case, the displacement of the main rope 8 in the second position P2 is smaller than the displacement of the main rope 8 in the first position P1. Thus, the second distance d2 may be a shorter distance than the first distance d1. Further, the second distance d2 may be the same distance as the first distance d1.

Further, the vibration suppression device 20 may include two or more stages of fixed units. That is, the vibration suppression device 20 may further include fixed units which are directed to a third position in the longitudinal direction of the main rope 8, the third position being different from the first position P1 and the second position P2.

Subsequently, a modification of Embodiment 2 will be described with reference to FIG. 11.

Figure 11:
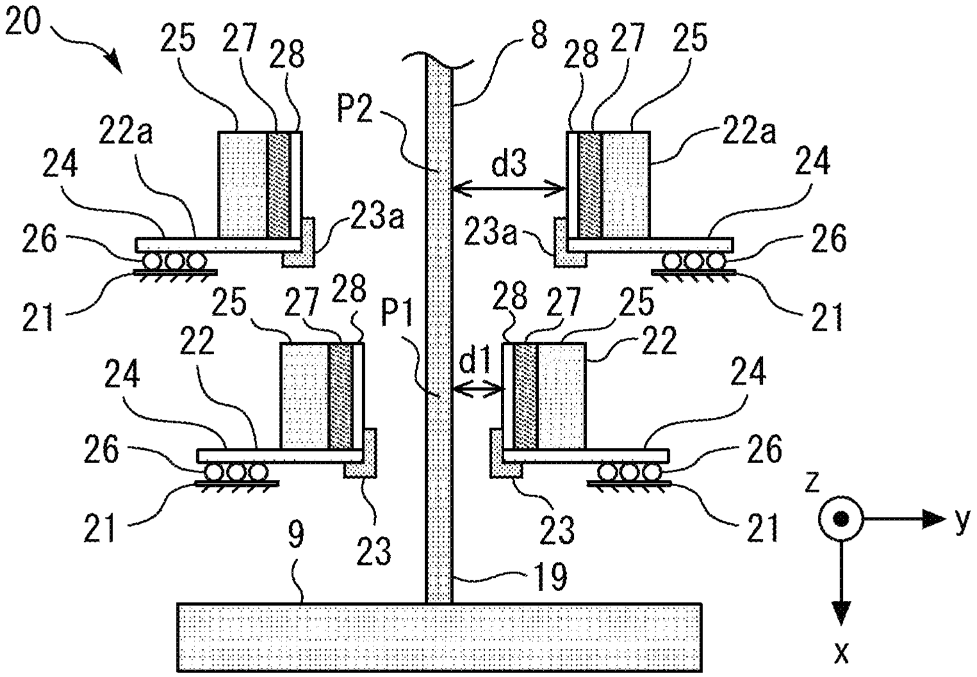
FIG. 11 A configuration diagram of a vibration suppression device according to the modification of Embodiment 2.

FIG. 11 is a configuration diagram of a vibration suppression device according to the modification of Embodiment 2.

FIG. 11 illustrates a vibration suppression device 20 as seen from a direction parallel with the z axis. The vibration suppression device 20 may include two or more stages of movable units and stoppers. For example, the vibration suppression device 20 includes main movable units 22 which are directed to the first position P1 of the main rope 8 and auxiliary movable units 22*a* which are directed to the second position P2 of the main rope 8. Further, the vibration suppression device 20 includes stoppers 23 corresponding to the main movable unit 22 and stoppers 23*a* corresponding to the auxiliary movable units 22*a*.

A magnet unit 25 of the auxiliary movable unit 22*a* is configured similarly to the magnet unit 25 of the fixed unit 29. The stopper 23*a* corresponding to the auxiliary movable unit 22*a* restricts movement of the corresponding movable unit 22*a* to a position closer than a third distance d3 from the equilibrium position 19 of the main rope 8. The third distance d3 is a distance which is in advance set based on vibration suppression performance necessary for the vibration suppression device 20. The third distance d3 is set similarly to the second distance d2, for example. The auxiliary movable unit 22*a* is an example of a third unit. The stopper 23*a* corresponding to the third unit is an example of a third stopper. The displacement amplification magnet 27 of the magnet unit 25 of the third unit is an example of a third displacement amplifier. The restriction member 28 of the magnet unit 25 is an example of a third restriction member.

While the magnitude of displacement of the second position P2 by vibration of the main rope 8 does not exceed the third distance d3, the auxiliary movable unit 22*a* performs an action similarly to the fixed unit 29. While the magnitude of displacement of the second position P2 by vibration of the main rope 8 does not exceed the third distance d3, the displacement amplification magnet 27 of the auxiliary movable unit 22*a* continues to amplify the displacement of the second position P2 of the main rope 8.

Here, in a case where the building sway 18 is much larger, for example, the magnitude of displacement of the second position P2 by vibration of the main rope 8 may reach the third distance d3. In this case, the main rope 8 contacts with the restriction member 28 of the auxiliary movable unit 22*a*. Similarly to the main movable unit 22, the auxiliary movable unit 22*a* moves together with the main rope 8 in a direction separating from the equilibrium position 19 of the main rope 8.

Subsequently, in a process where the main rope 8 returns to the equilibrium position 19 by a positive restoring force, the auxiliary movable unit 22*a* contacts with the stopper 23*a*. The stopper 23*a* restricts movement of the auxiliary movable unit 22*a* in a direction to approach the equilibrium position 19. The restriction member 28 of the auxiliary movable unit 22*a* causes the main rope 8 not to approach the displacement amplification magnet 27 of the movable unit 22*a* closer than the thickness of the restriction member 28. Thus, the magnitude of the positive restoring force of the main rope 8 at a time when the auxiliary movable unit 22*a* contacts with the stopper 23*a* is larger than the magnitude of a negative restoring force by the displacement amplification magnet 27 of the movable unit 22*a*. Accordingly, the main rope 8 returns to the equilibrium position 19 by the positive restoring force.

In such a manner, the vibration suppression device 20 includes the third unit and the third stopper. The third unit is a portion which is capable of movement in a direction in which the distance from the equilibrium position 19 changes. The third stopper restricts movement of the third unit to a position closer than the third distance d3 from the equilibrium position 19 of vibration of the rope-like body. The third unit includes the third displacement amplifier and the third restriction member. The third displacement amplifier is arranged to be directed to the second position P2 in the longitudinal direction of the rope-like body. The second position P2 is a different position from the first position P1 in the longitudinal direction. The third displacement amplifier amplifies displacement of vibration of the rope-like body by an attractive force which becomes stronger as the rope-like body approaches closer. The third restriction member inhibits the rope-like body from approaching the third displacement amplifier closer than a distance which is in advance set.

Accordingly, even after the rope-like body contacts with the first restriction member of the first unit, the vibration suppression device 20 can amplify displacement of the rope-like body by the third unit. Further, when the rope-like body contacts with the third restriction member, the third unit can move together with the rope-like body. Accordingly, a movable range of the rope-like body becomes wider. Consequently, the vibration suppression device 20 can more effectively suppress vibration of the rope-like body.

Subsequently, another modification of Embodiment 2 will be described with reference to FIG. 12.

Figure 12:
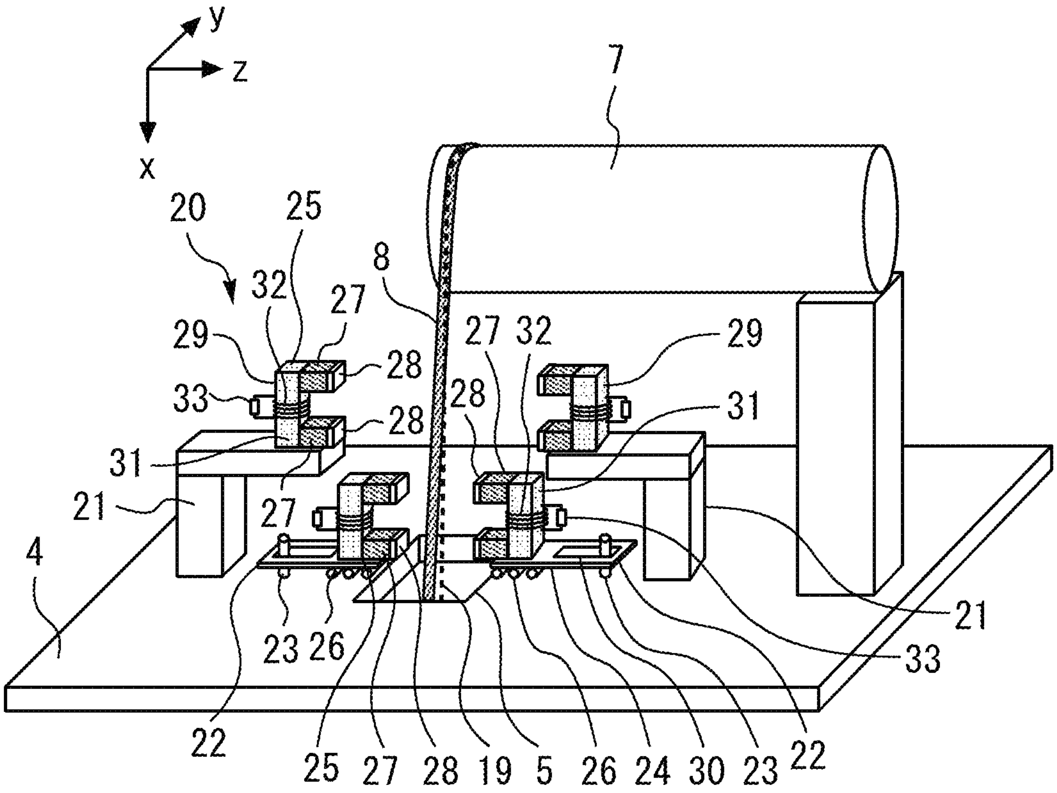
FIG. 12 A configuration diagram of a vibration suppression device according to the modification of Embodiment 2.

FIG. 12 is a configuration diagram of a vibration suppression device according to the modification of Embodiment 2.

FIG. 12 illustrates a perspective view of a vibration suppression device 20. In this example, the vibration suppression device 20 inhibits vibration of the main rope 8 in the z-axis direction. Note that the vibration suppression device 20 may be arranged to inhibit vibration of the rope-like body such as the main rope 8 in other directions in a yz plane, which include the y-axis direction. The vibration suppression device 20 is provided to the machine room 4. The vibration suppression device 20 is provided around the rope duct 5. The vibration suppression device 20 includes one pair of movable units 22, one pair of stoppers 23, and one pair of fixed units 29.

In the movable dolly 24 of the movable unit 22, a slot 30 which extends in the z-axis direction is provided on a farther side from the equilibrium position 19 than the magnet unit 25. The wheel 26 of the movable dolly 24 rolls on a floor surface of the machine room 4 in the z-axis direction.

The stopper 23 is fixed to the floor surface of the machine room 4, for example. In this example, the stopper 23 is a bar-shaped member which protrudes upward from the floor surface of the machine room 4. The stopper 23 is made to pass through the slot 30 of the movable dolly 24. When the stopper 23 contacts an end portion of the slot 30, the stopper 23 restricts movement of the movable unit 22. The stopper 23 may be arranged in the vibration plane of the main rope 8. Because the stopper 23 is arranged on a farther side from the equilibrium position 19 than the magnet unit 25, the main rope 8 does not contact with the stopper 23.

The movable unit 22 and the magnet unit 25 of the fixed unit 29 are similarly configured, for example. The magnet unit 25 includes two displacement amplification magnets 27, two restriction members 28, a yoke 31, a coil 32, and a resistor 33.

The two displacement amplification magnets 27 are permanent magnets, for example. Magnetic poles of end portions of the two displacement amplification magnets 27 are directed in parallel with each other. Magnetic poles of the two displacement amplification magnets 27 are directed to the first position P1 of the main rope 8. The two displacement amplification magnets 27 are juxtaposed in an up-down direction. The magnetic poles of the two displacement amplification magnets 27 are directed in antiparallel.

The two restriction members 28 are non-magnetic bodies. The two restriction members 28 are juxtaposed in the up-down direction. The restriction member 28 on an upper side corresponds to the displacement amplification magnet 27 on the upper side. The restriction member 28 on a lower side corresponds to the displacement amplification magnet 27 on the lower side. The restriction member 28 is provided to the magnetic pole, which is directed to the main rope 8, of the corresponding displacement amplification magnet 27. The restriction member 28 is arranged between the magnetic pole of the end portion of the corresponding displacement amplification magnet 27 and the main rope 8. Note that in the movable units 22 and the fixed units 29, the thicknesses of the restriction members 28 may be different from each other.

The yoke 31 is provided through the magnetic poles of the two displacement amplification magnets 27 on a far side from the main rope 8. The coil 32 is wound around the yoke 31. The resistor 33 is electrically connected with the coil 32.

When the movable unit 22 and the magnet unit 25 of the fixed unit 29 amplify the displacement of the main rope 8, due to a change in the displacement of the main rope 8, a magnetic flux passing through an internal portion of the yoke 31 changes. The magnetic flux passing through the internal portion of the yoke 31 is a magnetic flux which penetrates the coil 32. Thus, due to the change in the displacement of the main rope 8, an electromotive force is produced in the coil 32 by an electromagnetic induction phenomenon. The electromotive force produced in the coil 32 causes an electric current to flow in the resistor 33. Energy of the electric current flowing in the resistor 33 is dissipated as Joule heat. Thus, energy of the vibration of the main rope 8 is converted into thermal energy by the yoke 31, the coil 32, and the resistor 33 and is thereby consumed. Accordingly, displacement of the position of the main rope 8 to which the magnet unit 25 is directed is attenuated. That is, the combination of the yoke 31, the coil 32, and the resistor 33 is an example of an attenuator.

In such a manner, the vibration suppression device 20 includes an attenuator. The attenuator attenuates vibration of the first position P1 of the rope-like body. The displacement of the first position P1 of the rope-like body is amplified by the first unit and so forth. Because the attenuator attenuates vibration in a portion where displacement is amplified, the vibration suppression device 20 more effectively suppresses vibration of the rope-like body.

Subsequently, another modification of the Embodiment 2 will be described with reference to FIG. 13 to FIG. 15.

Figure 13:
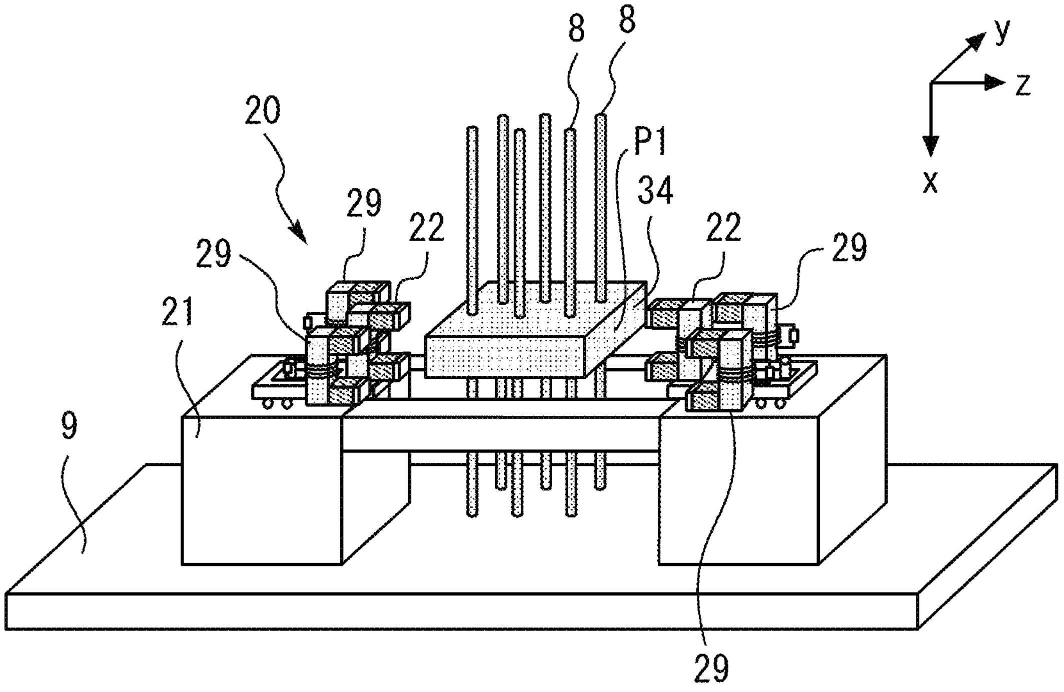
FIG. 13 A configuration diagram of a vibration suppression device according to the modification of the Embodiment 2.
Figure 14:
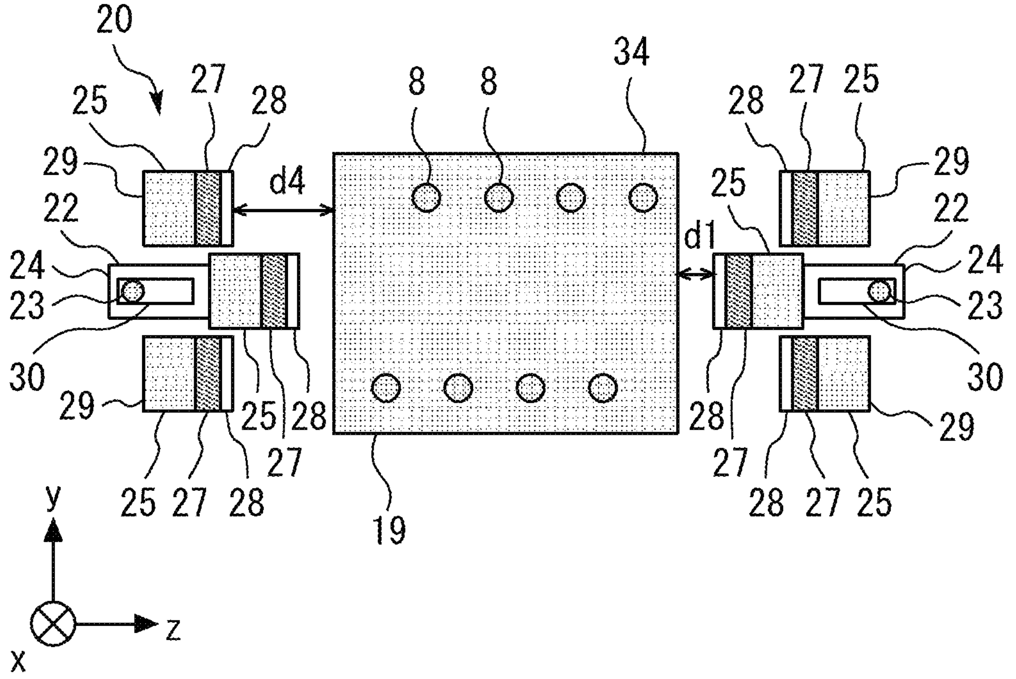
FIG. 14 A configuration diagram of a vibration suppression device according to the modification of the Embodiment 2.
Figure 15:
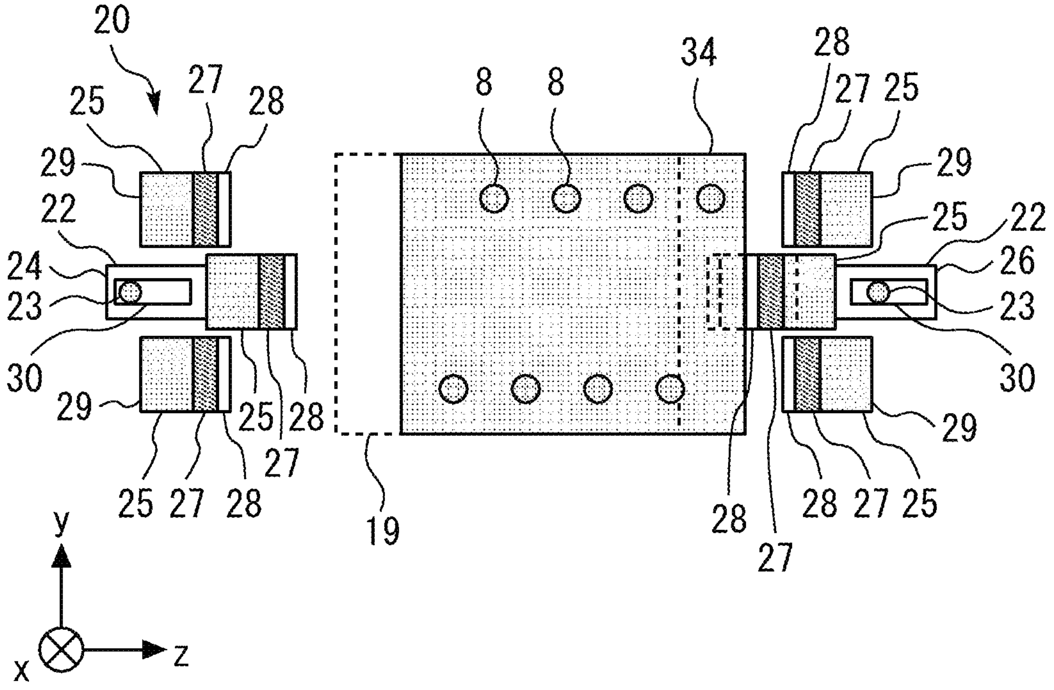
FIG. 15 A configuration diagram of a vibration suppression device according to the modification of the Embodiment 2.

FIG. 13 to FIG. 15 are configuration diagrams of a vibration suppression device according to the modification of the Embodiment 2.

FIG. 13 illustrates a perspective view of a vibration suppression device 20. In this example, the car 9 of the elevator 1 is suspended by a plurality of the main ropes 8. The plurality of the main ropes 8 are bundled by a constraint member 34. The constraint member 34 is a member which keeps positions of the plurality of the main ropes 8 in the horizontal direction in regular positions. The constraint member 34 is a block-shaped member which is fixed to each of the plurality of the main ropes 8, for example. The constraint member 34 bundles the main ropes 8 in the first position P1. The bundle of the plurality of the main ropes 8 with the constraint member 34 is an example of a rope-like body of the elevator 1. The constraint member 34 is formed with a ferromagnetic body, for example. In this case, the main ropes 8 do not have to have ferromagnetism.

In this example, the vibration suppression device 20 inhibits vibration of the rope-like body in the z-axis direction. Note that the vibration suppression device 20 may be arranged to inhibit vibration of the rope-like body in other directions in a yz plane, which include the y-axis direction. The vibration suppression device 20 is provided to a portion above the car 9. The vibration suppression device 20 includes one pair of movable units 22, one pair of stoppers 23, and four fixed units 29.

The pair of movable units 22 are arranged to be symmetric with respect to the rope-like body. One of the movable units 22 is arranged on a positive side of the rope-like body in the z-axis direction. The other movable unit 22 is arranged on a negative side of the rope-like body in the z-axis direction. Each of the pair of movable units 22 is arranged to be directed to the constraint member 34 of the rope-like body.

Each of the pair of stoppers 23 is fixed to the support base 21, for example. The pair of stoppers 23 are arranged to be symmetric with respect to the rope-like body. One of the stoppers 23 is arranged on a positive side of the rope-like body in the z-axis direction. The other stopper 23 is arranged on a negative side of the rope-like body in the z-axis direction. The stopper 23 on the positive side in the z-axis direction corresponds to the movable unit 22 on the positive side in the z-axis direction. The stopper 23 on the negative side in the z-axis direction corresponds to the movable unit 22 on the negative side in the z-axis direction.

FIG. 14 illustrates the vibration suppression device 20 as seen from above. Four fixed units 29 are arranged to be symmetric with respect to an xz plane as a vibration plane of the rope-like body. The four fixed units 29 are arranged to be symmetric with respect to an xy plane as a plane of symmetry of vibration of the rope-like body. The two fixed units 29 arranged on the positive side in the z-axis direction are arranged to interpose the movable unit 22 on the positive side in the z-axis direction from both sides in the y-axis direction. The two fixed units 29 arranged on the negative side in the z-axis direction are arranged to interpose the movable unit 22 on the negative side in the z-axis direction from both sides in the y-axis direction. Each of the four fixed units 29 is arranged to be directed to the constraint member 34 of the rope-like body. Each of the four fixed units 29 is arranged in a position at a fourth distance d4 from the equilibrium position 19 of the rope-like body. The fourth distance d4 is a distance which is in advance set based on vibration suppression performance necessary for the vibration suppression device 20. The fourth distance d4 is a longer distance than the first distance d1. Each of the four fixed units 29 is an example of a fourth unit. The displacement amplification magnet 27 of the magnet unit 25 of the fourth unit is an example of a fourth displacement amplifier. The restriction member 28 of the magnet unit 25 is an example of a fourth restriction member.

FIG. 15 illustrates the vibration suppression device 20 as seen from above. When the plurality of the main ropes 8 vibrate, the constraint member 34 keeps the positions of the plurality of the main ropes 8 in the horizontal direction in the regular positions. Thus, the plurality of the main ropes 8 and the constraint member 34 integrally vibrate as the rope-like body. The movable unit 22 and the fixed unit 29 of the vibration suppression device 20 cause a negative restoring force to act on the rope-like body via the constraint member 34. When the constraint member 34 contacts with the restriction member 28 of the movable unit 22, the movable unit 22 moves together with the rope-like body. In this case, the movable unit 22 does not cause the negative restoring force to act on the rope-like body.

In such a manner, the vibration suppression device 20 includes the fourth unit. The fourth unit is provided in the position at the fourth distance d4 from the equilibrium position 19. The fourth distance d4 is a longer distance than the first distance d1. The fourth unit includes the fourth displacement amplifier and the fourth restriction member. The fourth displacement amplifier is arranged to be directed to the first position P1 in the longitudinal direction of the rope-like body. The fourth displacement amplifier amplifies displacement of vibration of the rope-like body by an attractive force which becomes stronger as the rope-like body approach closer. The fourth restriction member inhibits the rope-like body from approaching the fourth displacement amplifier closer than a distance which is in advance set.

Accordingly, even after the rope-like body contact with the first restriction member of the first unit, the vibration suppression device 20 can amplify displacement of the rope-like body by the fourth unit. Further, a movable range of the displacement of the rope-like body becomes wider than a case where a single fixed unit 29 suppresses vibration. Further, the fourth unit is arranged at the same height as the first unit and is thus unlikely to interfere with other devices of the vibration suppression device 20.

Subsequently, another modification of Embodiment 2 will be described with reference to FIG. 16.

Figure 16:
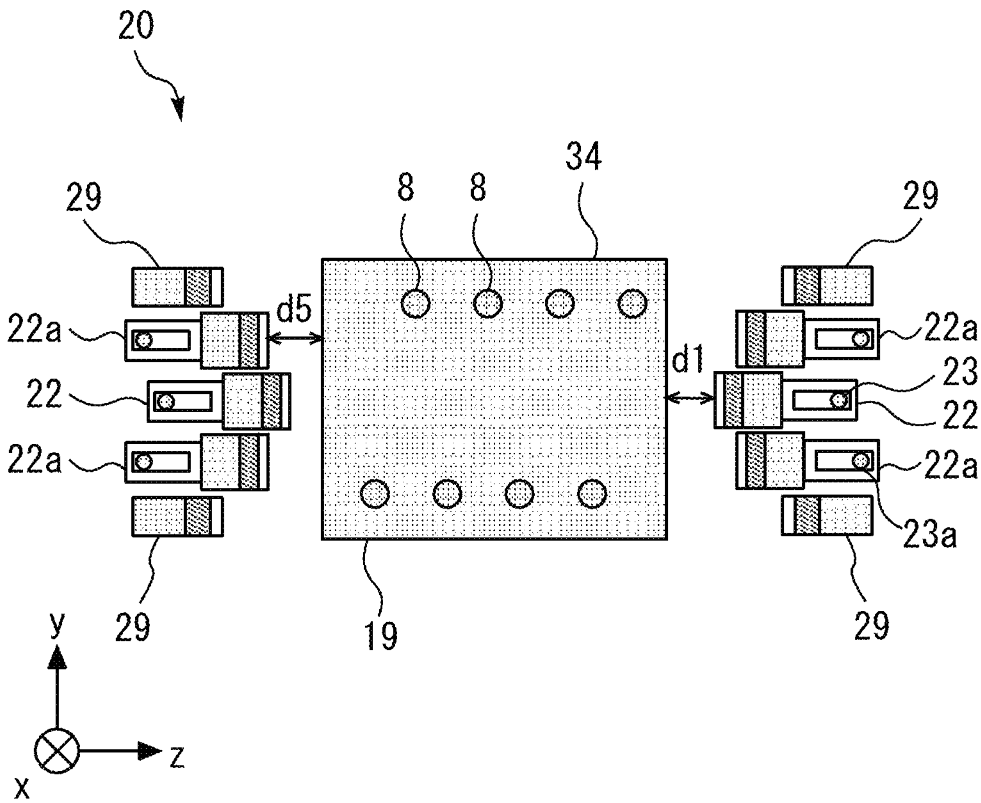
FIG. 16 A configuration diagram of a vibration suppression device according to the modification of Embodiment 2.

FIG. 16 is a configuration diagram of a vibration suppression device according to the modification of Embodiment 2.

FIG. 16 illustrates a vibration suppression device 20 as seen from above. The vibration suppression device 20 may further include additional movable units 22*a* which are arranged in far positions from the equilibrium position 19 of the rope-like body in addition to one pair of movable units 22. For example, the vibration suppression device 20 includes one pair of main movable units 22 which are arranged in a plane including a center line of the rope-like body and four auxiliary movable units 22*a* which are arranged to interpose the pair of main movable units 22 from both sides in the y-axis direction. Further, the vibration suppression device 20 includes the stoppers 23 corresponding to the main movable unit 22 and the stoppers 23*a* corresponding to the auxiliary movable units 22*a*. The vibration suppression device 20 may include four fixed units 29 which are arranged to interpose the main movable units 22 and the auxiliary movable units 22*a* from both sides in the y-axis direction.

The magnet unit 25 of the auxiliary movable unit 22*a* is configured similarly to the magnet unit 25 of the main movable unit 22. The stopper 23*a* corresponding to the auxiliary movable unit 22*a* restricts movement of the corresponding movable unit 22*a* to a position closer than a fifth distance d5 from the equilibrium position 19 of the main ropes 8. The fifth distance d5 is a distance which is in advance set based on vibration suppression performance necessary for the vibration suppression device 20. The fifth distance d5 is set similarly to the fourth distance d4, for example. The auxiliary movable unit 22*a* is an example of a fifth unit. The stopper 23*a* corresponding to the fifth unit is an example of a fifth stopper. The displacement amplification magnet 27 of the magnet unit 25 of the fifth unit is an example of a fifth displacement amplifier. The restriction member 28 of the magnet unit 25 is an example of a fifth restriction member.

In such a manner, the vibration suppression device 20 includes the fifth unit and the fifth stopper. The fifth unit is a portion which is capable of movement in a direction in which the distance from the equilibrium position 19 changes. The fifth stopper restricts movement of the fifth unit to a position closer than the fifth distance d5 from the equilibrium position 19 of vibration of the rope-like body. The fifth distance d5 is a longer distance than the first distance d1. The fifth unit includes the fifth displacement amplifier and the fifth restriction member. The fifth displacement amplifier is arranged to be directed to the first position P1 in the longitudinal direction of the rope-like body. The fifth displacement amplifier amplifies displacement of vibration of the rope-like body by an attractive force which becomes stronger as the rope-like body approach closer. The fifth restriction member inhibits the rope-like body from approaching the fifth displacement amplifier closer than a distance which is in advance set.

Accordingly, even after the rope-like body contact with the first restriction member of the first unit, the vibration suppression device 20 can amplify displacement of the rope-like body by the fifth unit. Further, when the rope-like body contact with the fifth restriction member, the fifth unit can move together with the rope-like body. Accordingly, a movable range of the rope-like body become wider. Consequently, the vibration suppression device 20 can more effectively suppress vibration of the rope-like body. Further, the fifth unit is arranged at the same height as the first unit and is thus unlikely to interfere with other devices of the vibration suppression device 20.

Note that the vibration suppression device 20 may combine a part or all of units which are the second unit to the fifth unit with the first unit. The magnet units 25 of the first unit to the fifth unit may have different configurations from each other. The magnet units 25 of the first unit to the fifth unit may have similar configurations to each other. All or a part of the respective displacement amplifiers which are the first displacement amplifier to the fifth displacement amplifier may amplify displacement of the rope-like body by a mechanical mechanism which has instability or by a force other than a magnetic force such as an electrostatic force, for example.

Embodiment 3

A particularly detailed description will be made about points in Embodiment 3 which are different from examples disclosed in Embodiment 1 or Embodiment 2. As characteristics which will not be described in Embodiment 3, any characteristics of the examples disclosed in Embodiment 1 or Embodiment 2 may be employed.

Figure 17:
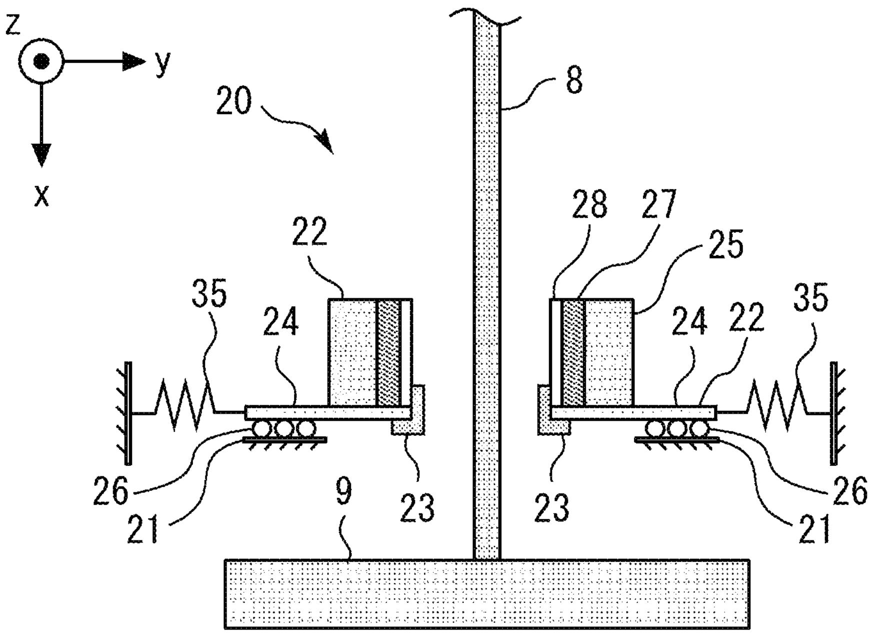
FIG. 17 A configuration diagram of a vibration suppression device according to Embodiment 3.

FIG. 17 is a configuration diagram of a vibration suppression device according to Embodiment 3.

FIG. 17 illustrates a vibration suppression device 20 as seen from a direction parallel with the z axis. In this example, the vibration suppression device 20 inhibits vibration of the main rope 8 in the y-axis direction. Note that the vibration suppression device 20 may be arranged to inhibit vibration of the rope-like body such as the main rope 8 in other directions in a yz plane, which include the z-axis direction. The vibration suppression device 20 is provided to a portion above the car 9. The vibration suppression device 20 includes one pair of movable units 22, one pair of stoppers 23, and one pair of restitution springs 35.

One of the restitution springs 35 is provided to the movable unit 22 on a positive side in the y-axis direction. The other restitution spring 35 is provided to the movable unit 22 on a negative side in the y-axis direction. The restitution spring 35 is provided to an end portion of the movable unit 22 on the opposite side to the stopper 23 in a compressed condition so as to press the movable unit 22 to the stopper 23 by an elastic force. The restitution spring 35 is fixed to a structure or the like in a portion above the car 9, which includes the support base 21, for example. The restitution spring 35 is an example of a restitution mechanism.

In a process where the main rope 8 returns to the equilibrium position 19 by a positive restoring force, the movable unit 22 moves in a direction to approach the equilibrium position 19 by a force acting between the displacement amplification magnet 27 and the main rope 8. In this case, when the restitution spring 35 is not provided, the movable unit 22 possibly stands still due to a friction resistance or the like, for example, before contacting with the stopper 23. Further, due to a reaction to a collision with the stopper 23, the movable unit 22 possibly again moves in a direction separating from the equilibrium position 19 and stands still. When the movable unit 22 stands still in a position farther from the equilibrium position 19 than the stopper 23, the displacement of the main rope 8 is not effectively amplified by the displacement amplification magnet 27. Thus, the restitution spring 35 pushes the movable unit 22 to cause it to approach the equilibrium position 19 by the elastic force. Thus, the movable unit 22 is inhibited from standing still in a position farther from the equilibrium position 19 than the stopper 23.

As described above, the vibration suppression device 20 according to Embodiment 3 includes the restitution mechanism. When the first unit is separated from the equilibrium position 19 farther than the first distance d1, the restitution mechanism causes the first unit to approach the equilibrium position 19. The restitution mechanism is the restitution spring 35. The restitution spring 35 causes the first unit to approach the equilibrium position 19 by the elastic force. Accordingly, the first unit can be inhibited from standing still, by friction or the like, in a position separated farther than the first distance d1 from the equilibrium position 19. Thus, the vibration suppression device 20 can more stably suppress vibration of the rope-like body.

Subsequently, a modification of Embodiment 3 will be described with reference to FIG. 18.

Figure 18:
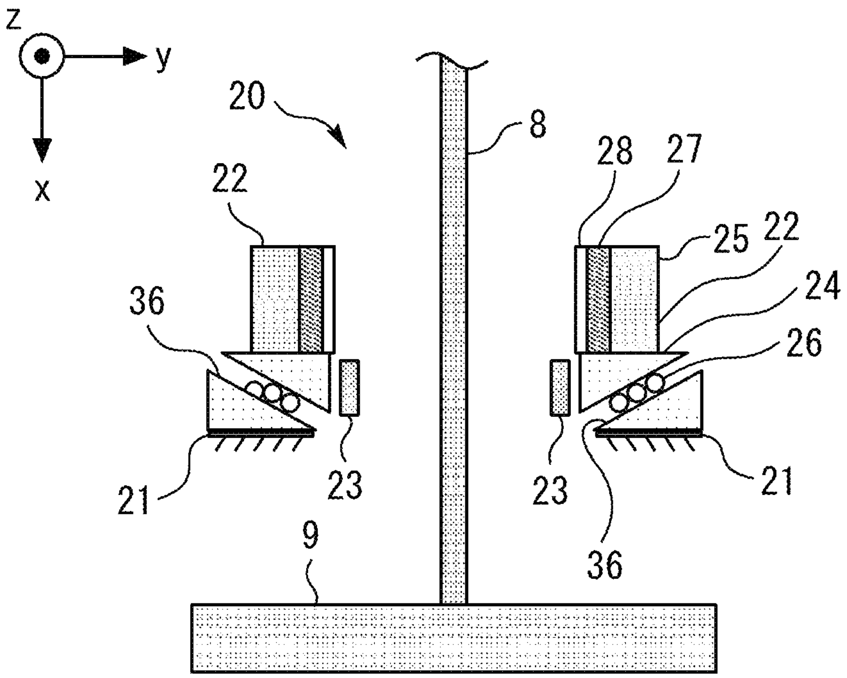
FIG. 18 A configuration diagram of a vibration suppression device according to the modification of Embodiment 3.

FIG. 18 is a configuration diagram of a vibration suppression device according to the modification of Embodiment 3.

FIG. 18 illustrates a vibration suppression device 20 as seen from a direction parallel with the z axis. In this example, the vibration suppression device 20 inhibits vibration of the main rope 8 in the y-axis direction. Note that the vibration suppression device 20 may be arranged to inhibit vibration of the rope-like body such as the main rope 8 in other directions in a yz plane, which include the z-axis direction. The vibration suppression device 20 is provided to a portion above the car 9. The vibration suppression device 20 includes one pair of movable units 22, one pair of stoppers 23, and one pair of restitution slopes 36.

A lower surface of the movable dolly 24 of the movable unit 22 is inclined such that a side closer to the equilibrium position 19 of the main rope 8 becomes lower. The wheel 26 of the movable dolly 24 is arranged to be inclined along the inclined lower surface.

Each of the pair of restitution slopes 36 is fixed to an upper surface of the support base 21, for example. Alternatively, each of the pair of restitution slopes 36 may be formed integrally with the support base 21. One of the restitution slopes 36 is provided below the movable unit 22 on a positive side in the y-axis direction. The other restitution slope 36 is provided below the movable unit 22 on a negative side in the y-axis direction. The restitution slope 36 is inclined such that a side closer to the equilibrium position 19 becomes lower so that the movable unit 22 is caused to receive a force by its dead load, which is directed to the stopper 23. An inclined surface of the restitution slope 36 is set parallel with the lower surface of the movable dolly 24, for example. The restitution slope 36 is an example of the restitution mechanism.

Here, the restitution slope 36 causes the movable unit 22 to receive a component force of the gravity of its dead load in a direction to approach the equilibrium position 19. Thus, the movable unit 22 is inhibited from standing still in a position farther from the equilibrium position 19 than the stopper 23.

As described above, the restitution mechanism of the vibration suppression device 20 is the restitution slope 36. The restitution slope 36 causes the first unit to approach the equilibrium position 19 by the gravity applied to the first unit. Accordingly, the first unit can be inhibited from standing still, by friction or the like, in a position separated farther than the first distance d1 from the equilibrium position 19. Thus, the vibration suppression device 20 can more stably suppress vibration of the rope-like body.

INDUSTRIAL APPLICABILITY

A vibration suppression device according to the present invention can be applied to an elevator.

REFERENCE SIGNS LIST

1 Elevator
2 Building
3 Hoistway
4 Machine room
5 Rope duct
6 Pit
7 Traction machine
8 Main rope
9 Car
10 Counterweight
11 Compensation rope
12 Tension sheave
13 Governor
14 Governor rope
15 Governor rope tension sheave
16 Traveling cable
17 Control panel
18 Building sway
19 Equilibrium position
20 Vibration suppression device
21 Support base
22, 22*a* Movable unit
23, 23*a* Stopper
24 Movable dolly
25 Magnet unit
26 Wheel
27 Displacement amplification magnet
28 Restriction member
29 Fixed unit
30 Slot
31 Yoke
32 Coil
33 Resistor
34 Constraint member
35 Restitution spring
36 Restitution slope
P1 First position
P2 Second position
d1 First distance
d2 Second distance
d3 Third distance
d4 Fourth distance
d5 Fifth distance

The invention claimed is:

1. A vibration suppression device for a rope-like body of an elevator, comprising:

a first unit which is capable of movement in a direction in which a distance from an equilibrium position of vibration of the rope-like body of the elevator changes; and a first stopper, fixed in position and shape, which stops movement of the first unit to a position closer than a first distance from the equilibrium position, wherein the first unit includes a first displacement amplifier which is arranged to be directed to a first position in a longitudinal direction of the rope-like body and amplifies displacement of vibration of the rope-like body by an attractive force which becomes stronger as the rope-like body approaches closer, and a first restriction body which inhibits the rope-like body from approaching the first displacement amplifier closer than a predetermined distance, and wherein the first unit moves together with the rope-like body towards a direction separating from the equilibrium position when the rope-like body, which is moving towards the direction separating from the equilibrium position, contact with the first unit, and the first stopper restricts the movement of the first unit to a position closer than the first distance from the equilibrium position when the first unit, which is moving towards a direction approaching the equilibrium position in a process where the rope-like body returns to the equilibrium position, contact with the first stopper.

2. The vibration suppression device for the rope-like body of the elevator according to claim 1, wherein:

the first displacement amplifier amplifies displacement of the rope-like body by a magnetic force, the rope-like body having magnetism, and the first restriction body is a non-magnetic body which is provided to an end portion of the first displacement amplifier on a side directed to the rope-like body.

3. The vibration suppression device for the rope-like body of the elevator according to claim 1, further comprising:

an attenuator which attenuates vibration of the first position of the rope-like body.

4. The vibration suppression device for the rope-like body of the elevator according to claim 1, further comprising:

a position corrector which causes the first unit to approach the equilibrium position when the first unit is separated from the equilibrium position farther than the first distance.

5. The vibration suppression device for the rope-like body of the elevator according to claim 4, wherein:

the position corrector is a restitution spring which causes the first unit to approach the equilibrium position by an elastic force.

6. The vibration suppression device for the rope-like body of the elevator according to claim 4, wherein:

the position corrector is a restitution slope which causes the first unit to approach the equilibrium position by gravity applied to the first unit.

7. The vibration suppression device for the rope-like body of the elevator according to claim 1, further comprising:

a second unit which is provided in a position at a second distance from the equilibrium position, wherein the second unit includes a second displacement amplifier which is arranged to be directed to a second position different from the first position in the longitudinal direction of the rope-like body and amplifies displacement of vibration of the rope-like body by an attractive force which becomes stronger as the rope-like body approaches closer, and a second restriction body which inhibits the rope-like body from approaching the second displacement amplifier closer than a predetermined distance.

8. A vibration suppression device for a rope-like body of an elevator, comprising:

a first unit which is capable of movement in a direction in which a distance from an equilibrium position of vibration of the rope-like body of the elevator changes; and a first stopper which restricts movement of the first unit to a position closer than a first distance from the equilibrium position, wherein the first unit includes
a first displacement amplifier which is arranged to be directed to a first position in a longitudinal direction of the rope-like body and amplifies displacement of vibration of the rope-like body by an attractive force which becomes stronger as the rope-like body approaches closer, and
a first restriction body which inhibits the rope-like body from approaching the first displacement amplifier closer than a predetermined distance,
and wherein
the first unit moves together with the rope-like body towards a direction separating from the equilibrium position when the rope-like body, which is moving towards the direction separating from the equilibrium position, contact with the first unit, and
the first stopper restricts the movement of the first unit to a position closer than the first distance from the equilibrium position when the first unit, which is moving towards a direction approaching the equilibrium position in a process where the rope-like body returns to the equilibrium position, contact with the first stopper,
the vibration suppression device further comprises a position corrector which causes the first unit to approach the equilibrium position when the first unit is separated from the equilibrium position farther than the first distance,
wherein the position corrector is a restitution slope which causes the first unit to approach the equilibrium position by gravity applied to the first unit.

* * * * *